United States Patent
Brisebois

(10) Patent No.: US 9,204,288 B2
(45) Date of Patent: Dec. 1, 2015

(54) INTELLIGENT ADAPTATION OF ADDRESS BOOKS

(71) Applicant: AT&T Mobility II LLC, Atlanta, GA (US)

(72) Inventor: Arthur Richard Brisebois, Cumming, GA (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

(21) Appl. No.: 14/036,030

(22) Filed: Sep. 25, 2013

(65) Prior Publication Data

US 2015/0087275 A1    Mar. 26, 2015

(51) Int. Cl.
*H04M 1/725* (2006.01)
*H04W 8/22* (2009.01)
*H04W 8/26* (2009.01)
*H04W 52/02* (2009.01)

(52) U.S. Cl.
CPC *H04W 8/22* (2013.01); *H04W 8/26* (2013.01); *H04W 52/0254* (2013.01)

(58) Field of Classification Search
CPC ......... H04W 4/001; H04W 4/16; H04W 4/18; H04W 4/20; H04W 24/00; H04W 24/06; H04W 24/10; H04W 8/22; H04W 8/26; H04W 52/0254; H04W 52/0258
USPC ........ 455/414.1, 412.1, 412.2, 415, 417, 466, 455/467, 566, 567, 432.3
See application file for complete search history.

(56) References Cited

U.S. PATENT DOCUMENTS

| | | | |
|---|---|---|---|
| 6,332,024 B1 | 12/2001 | Inoue et al. | |
| 6,538,636 B1 | 3/2003 | Harrison | |
| 6,782,279 B2 | 8/2004 | Wang | |
| 7,171,243 B2 | 1/2007 | Watanabe | |
| 7,386,279 B2 | 6/2008 | Wagner et al. | |
| 7,694,237 B2 | 4/2010 | Pusa et al. | |
| 7,725,419 B2 | 5/2010 | Lee et al. | |
| 7,861,184 B2 | 12/2010 | Kim et al. | |
| 8,037,421 B2 | 10/2011 | Scott et al. | |
| 8,127,250 B2 | 2/2012 | Kim et al. | |
| 8,209,627 B2 | 6/2012 | Yamashita | |
| 8,209,631 B2 | 6/2012 | Kraft et al. | |
| 8,434,023 B2 | 4/2013 | Ge | |
| 8,738,161 B2* | 5/2014 | Ni | 700/94 |
| 8,760,426 B1 | 6/2014 | Strand et al. | |
| 2002/0177419 A1* | 11/2002 | Hwang | 455/90 |
| 2003/0040850 A1 | 2/2003 | Najmi et al. | |
| 2004/0053605 A1 | 3/2004 | Martyn et al. | |

(Continued)

OTHER PUBLICATIONS

Hosub Lee et al., "Fit Your Hand: Personalized User Interface Considering Physical Attributes of Mobile Device Users," UIST '11 Adjunct Proceedings of the 24th Annual ACM Symposium Adjunct on User Interface Software and Technology, Oct. 16-19, 2011, pp. 59-60.

*Primary Examiner* — Jean Gelin
(74) *Attorney, Agent, or Firm* — Chiesa Shahinian & Giantomasi PC

(57) ABSTRACT

Address books may be intelligently adapted. A sensor output is received indicating a measure of vibration of a mobile device. An address book associated with the mobile device is retrieved and condensed according to the measure of the vibration to generate address favorites. The address favorites are displayed on a display device of the mobile device, such that the vibration experienced by the mobile device determines which contacts in the address book are preferred.

20 Claims, 29 Drawing Sheets

(56) References Cited

U.S. PATENT DOCUMENTS

| | | | |
|---|---|---|---|
| 2005/0054381 A1 | 3/2005 | Lee et al. | |
| 2005/0118996 A1 | 6/2005 | Lee et al. | |
| 2006/0095864 A1 | 5/2006 | Mock et al. | |
| 2007/0129050 A1 | 6/2007 | Ryu | |
| 2007/0254627 A1* | 11/2007 | Kikuchi et al. | 455/404.2 |
| 2008/0000301 A1* | 1/2008 | Davidson | 73/654 |
| 2008/0074384 A1 | 3/2008 | Orr et al. | |
| 2009/0178008 A1 | 7/2009 | Herz et al. | |
| 2010/0062811 A1 | 3/2010 | Park et al. | |
| 2010/0087230 A1 | 4/2010 | Peh et al. | |
| 2010/0097331 A1 | 4/2010 | Wu | |
| 2010/0144347 A1* | 6/2010 | Yamamoto et al. | 455/434 |
| 2010/0146444 A1 | 6/2010 | Wang et al. | |
| 2010/0159909 A1 | 6/2010 | Stifelman | |
| 2010/0185784 A1* | 7/2010 | De Nie et al. | 710/9 |
| 2010/0218141 A1 | 8/2010 | Xu et al. | |
| 2010/0222108 A1 | 9/2010 | Kashima | |
| 2011/0028138 A1 | 2/2011 | Davies-Moore et al. | |
| 2011/0057907 A1 | 3/2011 | Kim | |
| 2011/0105100 A1* | 5/2011 | Tanaka et al. | 455/418 |
| 2011/0276313 A1* | 11/2011 | Inaba | 702/187 |
| 2012/0096249 A1 | 4/2012 | Rubin et al. | |
| 2012/0220348 A1* | 8/2012 | Tsukuda | 455/567 |
| 2013/0014040 A1 | 1/2013 | Jagannathan et al. | |
| 2013/0019192 A1 | 1/2013 | Itoh et al. | |
| 2013/0082974 A1 | 4/2013 | Kerr et al. | |
| 2013/0111384 A1 | 5/2013 | Kim et al. | |
| 2013/0305187 A1 | 11/2013 | Phillips et al. | |
| 2014/0189551 A1 | 7/2014 | Kim | |
| 2014/0232569 A1* | 8/2014 | Skinder et al. | 340/989 |
| 2014/0237376 A1 | 8/2014 | Cassano | |
| 2015/0026624 A1 | 1/2015 | Hui et al. | |

\* cited by examiner

FIG. 21

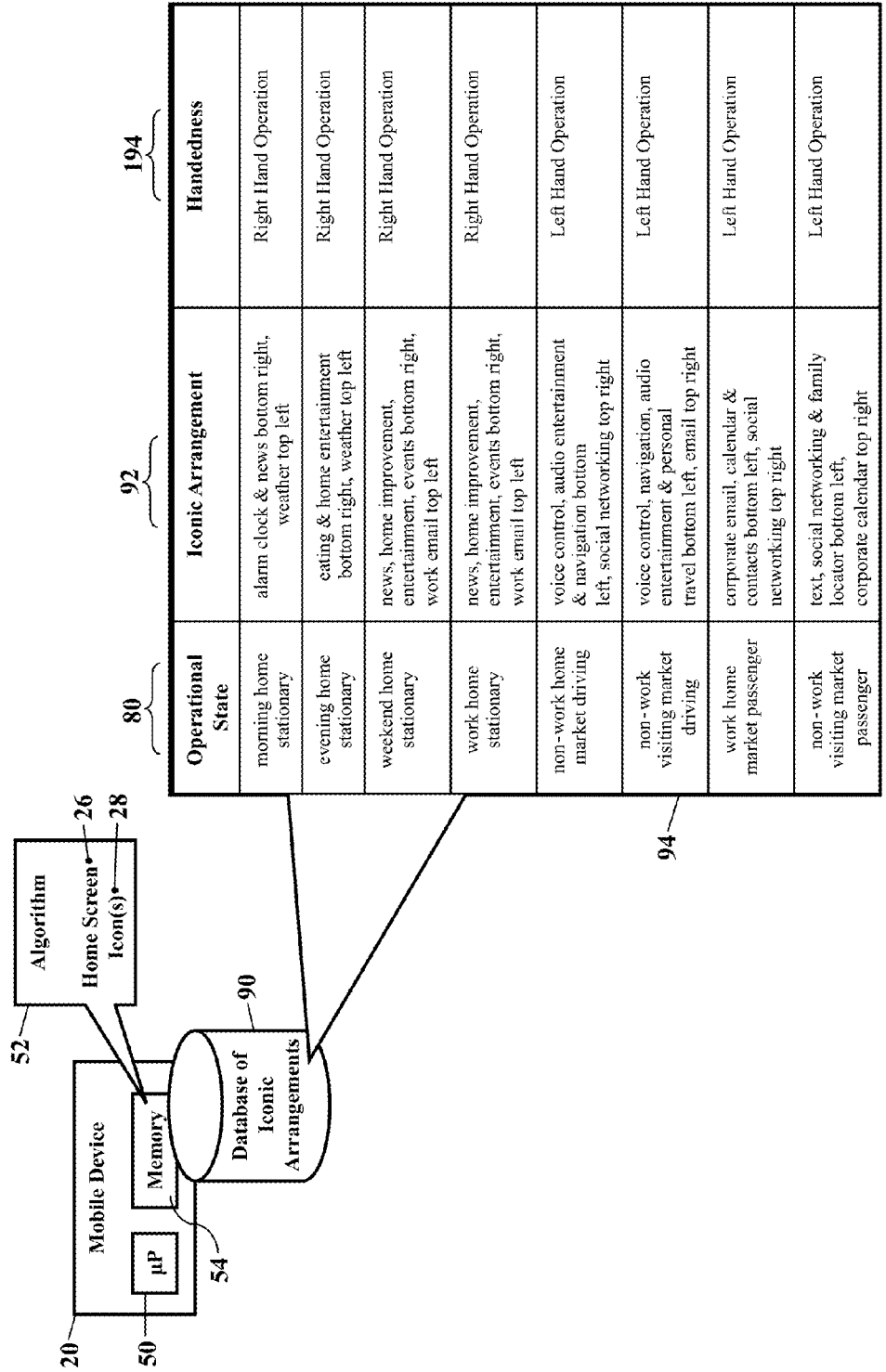

| Operational State (80) | Iconic Arrangement (92) | Handedness (194) |
|---|---|---|
| morning home stationary | alarm clock & news bottom right, weather top left | Right Hand Operation |
| evening home stationary | eating & home entertainment bottom right, weather top left | Right Hand Operation |
| weekend home stationary | news, home improvement, entertainment, events bottom right, work email top left | Right Hand Operation |
| work home stationary | news, home improvement, entertainment, events bottom right, work email top left | Right Hand Operation |
| non-work home market driving | voice control, audio entertainment & navigation bottom left, social networking top right | Left Hand Operation |
| non-work visiting market driving | voice control, navigation, audio entertainment & personal travel bottom left, email top right | Left Hand Operation |
| work home market passenger | corporate email, calendar & contacts bottom left, social networking top right | Left Hand Operation |
| non-work visiting market passenger | text, social networking & family locator bottom left, corporate calendar top right | Left Hand Operation |

INTELLIGENT ADAPTATION OF ADDRESS BOOKS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Mobile communications have revolutionized our lives. Today mobile applications may be downloaded for all manner of services and games. As users download more and more applications, however, their mobile devices become cluttered with iconic representations. In other words, there are simply too many application icons for most users to manage.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein:

FIGS. 20-21 are schematics illustrating handedness, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
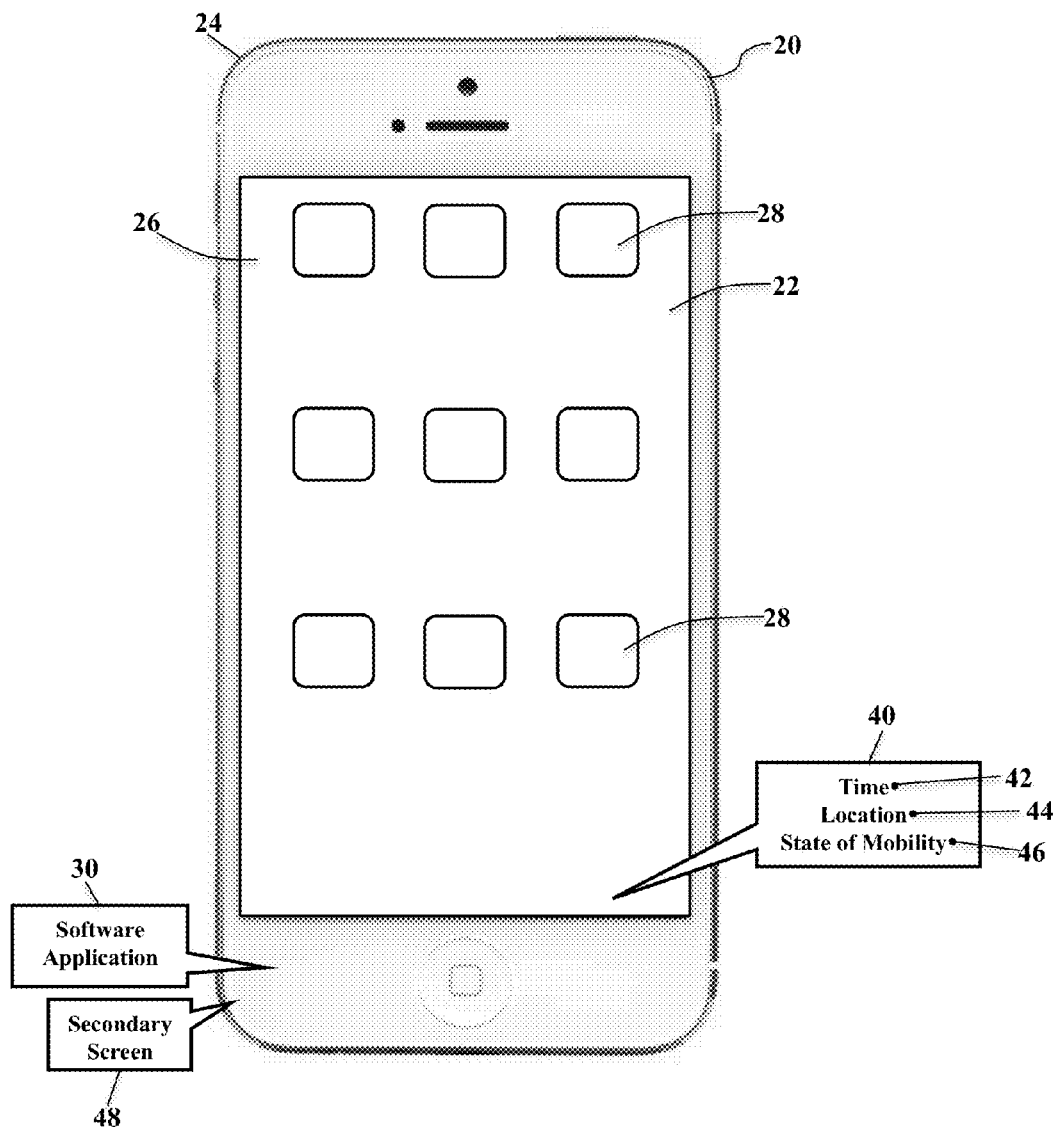
FIG. 1 is a simplified schematic illustrating an environment in which exemplary embodiments may be implemented.

FIG. 1 is a simplified schematic illustrating an environment in which exemplary embodiments may be implemented. FIG. 1 illustrates a mobile device 20 having a display device 22. The mobile device 20, for simplicity, is illustrated as a smart phone 24, but the mobile device 20 may be any mobile or stationary processor-controlled device (as later paragraphs will explain). The display device 22 displays a home screen 26 with icons 28. Each icon 28 typically corresponds to one of several software applications 30 executed by the mobile device 20. The display device 22 may be a touch screen, thus allowing the user to touch, tap, or otherwise select any icon 28. Should the user select one of the icons 28, the mobile device 20 launches, resumes, or calls the corresponding software application 30. As iconic representation is well known, this disclosure need not provide a detailed explanation.

Exemplary embodiments may automatically rearrange the icons 28. As the user carries the mobile device 20, various conditions 40 are sensed or determined. The icons 28 may then be rearranged on the home screen 26, according to the conditions 40. For example, exemplary embodiments may rearrange the icons 28 according to time 42, location 44, and/or state 46 of mobility. At a certain time 42 of day, for example, one of the software applications 30 may be preferred, based on historical use. At a particular location 44, another one of the software applications 30 may be preferred. When the mobile device 20 travels, the state 46 of mobility may force some of the software applications 30 to be unavailable, while other software applications 30 may be brought to the home screen 26. So, as the conditions 40 change throughout the day, exemplary embodiments determine which of the software applications 30 is preferred, and the corresponding icon(s) 28 may be promoted for display by the home screen 26. The user may thus have quick access to the preferred icon 28 without fumbling through secondary screens.

Demotion may be required. Sometimes there are more icons 28 that can be displayed on the home screen 26. When the mobile device 20 stores or accesses many software applications 30, there may be too many icons 28 to simultaneously display on the single home screen 26. The mobile device 20 may thus generate and store one or more secondary screens 48 that, when selected, display remaining ones of the icons 28. So, when a preferred icon 28 is promoted to the home screen 26, one or more remaining icons 28 may be removed from the home screen 26. That is, some icons 28 may be demoted to the secondary screens 48.

The home screen 26 may thus intelligently adapt to the conditions 40. As the user carries the mobile device 20, the mobile device 20 evaluates the conditions 40. The home screen 26 learns and adapts to the user, based on the conditions 40. The icons 28 displayed on the home screen 26 may thus be intelligently promoted and demoted according to the conditions 40. At any time 42, location 44, and/or state 46 of mobility, the user has quick and easy access to the corresponding software applications 30.

Figure 2:
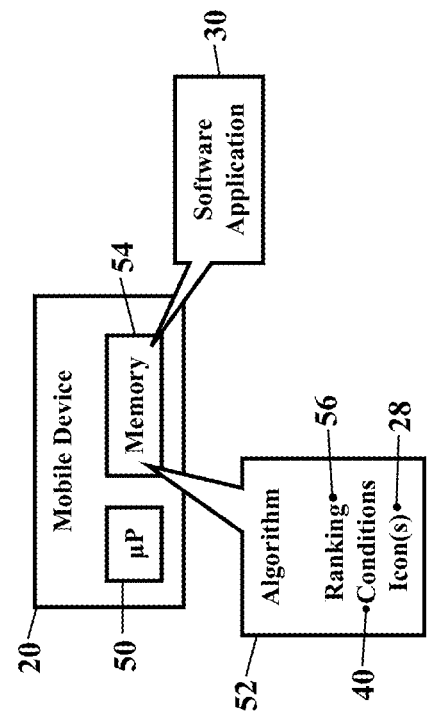
FIG. 2 is a more detailed block diagram illustrating the operating environment, according to exemplary embodiments.

FIG. 2 is a more detailed block diagram illustrating the operating environment, according to exemplary embodiments. The mobile device 20 may have a processor 50 (e.g., "µP"), application specific integrated circuit (ASIC), or other component that executes an algorithm 52 stored in a local memory 54. The memory 54 may also store the software applications 30 (such as an SMS texting application, a call application, calendar application, and a web browser application). The algorithm 52 has instructions, code, and/or programs that may cause the processor 50 to generate a ranking 56 of the software applications 30, according to the conditions 40. When the display device 22 displays the home screen 26, the algorithm 52 may also instruct the processor 50 to adapt the corresponding icons 28 according to the conditions 40.

Figure 3:
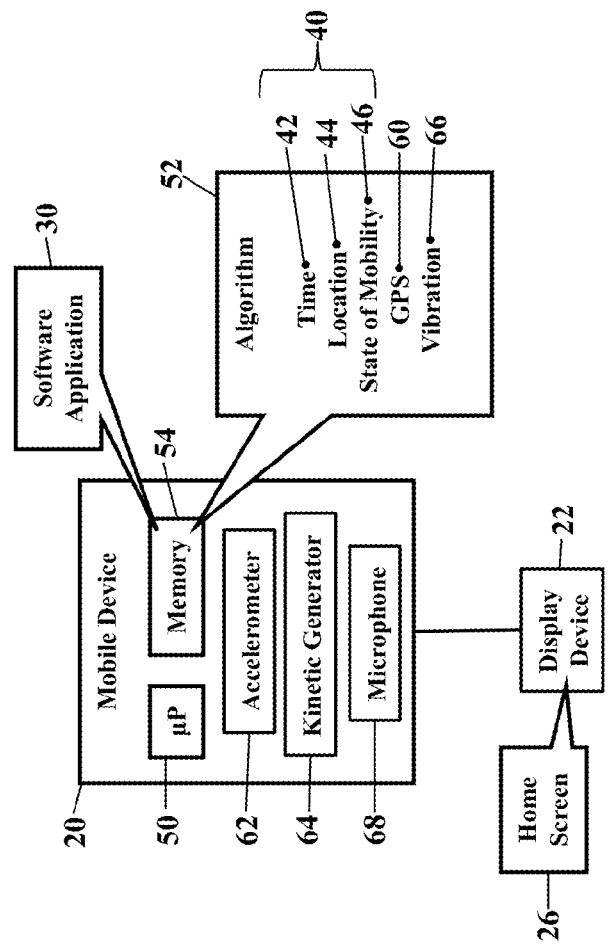
FIG. 3 is a schematic illustrating detection of conditions, according to exemplary embodiments.

FIG. 3 is a schematic illustrating detection of the conditions 40, according to exemplary embodiments. Whenever the mobile device 20 is powered on, the algorithm 52 may obtain the time 42 of day, the location 44, and the state 46 of mobility. The home screen 26 (or user interface) is rarely used under the same conditions at all times and locations. Indeed, smartphones have become popular due to their flexibility and usefulness under most, if not all, of the conditions 40 the user experiences each day. This flexibility is primarily enabled by the variety of the software applications 30 that may be stored and executed. Even though the mobile device 20 has the flexibility to run many different software applications 30, each specific software application 30 may only be useful, or safe, for a narrow subset of the conditions 40. For example, a GPS-based navigation application may be useful when driving, but GPS signals are usually not received indoors and useless when stationary. Likewise, an email client may be useful when stationary, but useless and unsafe when driving. Social networking applications are typically useful when at home during non-work hours, but generally used less at work during the day. Exemplary embodiments, then, detect the conditions 40 in which the mobile device 20 and/or any of the software applications 30 are used.

The algorithm 52 thus acquires the time 42 and the location 44. The time 42 may be determined from a clock signal, from a network signal, or from any known method. The time 42 may also be retrieved from a calendar application. The time 42 may be expressed along with the current day, month, and year. The location 44 is commonly determined from a global positioning system ("GPS") receiver, but the location 44 may be determined from WI-FI® access points, network identifiers, and/or any known method.

The time 42 and the location 44 may be adaptively combined. The algorithm 52 may determine the mobile device 20 is currently at the "home" location 44 based on detection of a residential network, along with morning or night hours. A "work" location 44 may be determined from detection of an office network, along with weekday daytime hours (e.g., 9 AM to 5 PM). The algorithm 52 may also distinguish between a "home" and a "visiting" market, perhaps again based on radio network identifiers (e.g., LTE tracking area or UMTS Location Area). Should the algorithm 52 detect a never-before seen tracking area, the algorithm 52 may assume the mobile device 20 is located in a non-home, visiting market. The algorithm 52 may also generate a prompt on the display device 22, asking the user to confirm or input the time 42 and/or the location 44.

BLUETOOTH® pairing may also be used. When the mobile device 20 is operating in an automobile, the mobile device 20 may electronically pair, mate, or interface with a BLUETOOTH® transceiver for hands-free operation. If the mobile device 20 automatically pairs with the automobile, the algorithm 52 may assume the user is the driver of the automobile. Conversely, if the mobile device 20 is manually paired with the automobile, the algorithm 52 may assume the user is the passenger of the automobile. That is, automatic or manual pairing may determine whether the user is the driver or the passenger. The algorithm 52 may thus adapt the home screen 26 according to whether the mobile device 20 is used by the driver or the passenger.

Exemplary embodiments also determine the state 46 of mobility. The state 46 of mobility may be determined from information received from the global positioning system ("GPS") receiver (such as GPS information or coordinates 60). However, the state 46 of mobility may also be determined using sensor output from an accelerometer 62 and/or from a kinetic generator 64. As the user carries the mobile device 20, the accelerometer 62 and/or the kinetic generator 64 senses different levels or measurements of vibration 66. The vibration 66 may be random or cyclic motion, perhaps in one or more axes. Regardless, the accelerometer 62 and/or the kinetic generator 64 outputs a digital or analog signal (e.g., amplitude, frequency, voltage, current, pulse width) that is indicative of the vibration 66 during use of the mobile device 20. The algorithm 52 may use any parameter of the signal as an indication of the vibration 66 to determine the state 46 of mobility.

The kinetic generator 64 may detect the vibration 66. The kinetic generator 64 is any device that converts the vibration 66, or any motion, to electric current. The kinetic generator 64, for example, may be mechanical, piezoelectric, chemical, or any other technology.

Output from a microphone 68 may also be used. The mobile device 20 may have the microphone 68 to receive audible sounds and to output signals indicative of the sounds. As the user carries the mobile device 20, the algorithm 52 may use the output from the microphone 68 to further determine the state 46 of mobility. For example, the algorithm 52 may determine the state 46 of mobility as stationary, in response to little to no vibration 66 compared to a threshold value for stationary positions. The state 46 of mobility may be determined as walking, in response to the vibration 66 greater than some other threshold for human walking. Moreover, a frequency of the vibration 66 may also be compared to a threshold frequency for the walking determination. Vehicular movement may be determined in response to random frequencies of the vibration 66, perhaps coupled with known, low frequency road noises received by the microphone 68.

Figure 4:
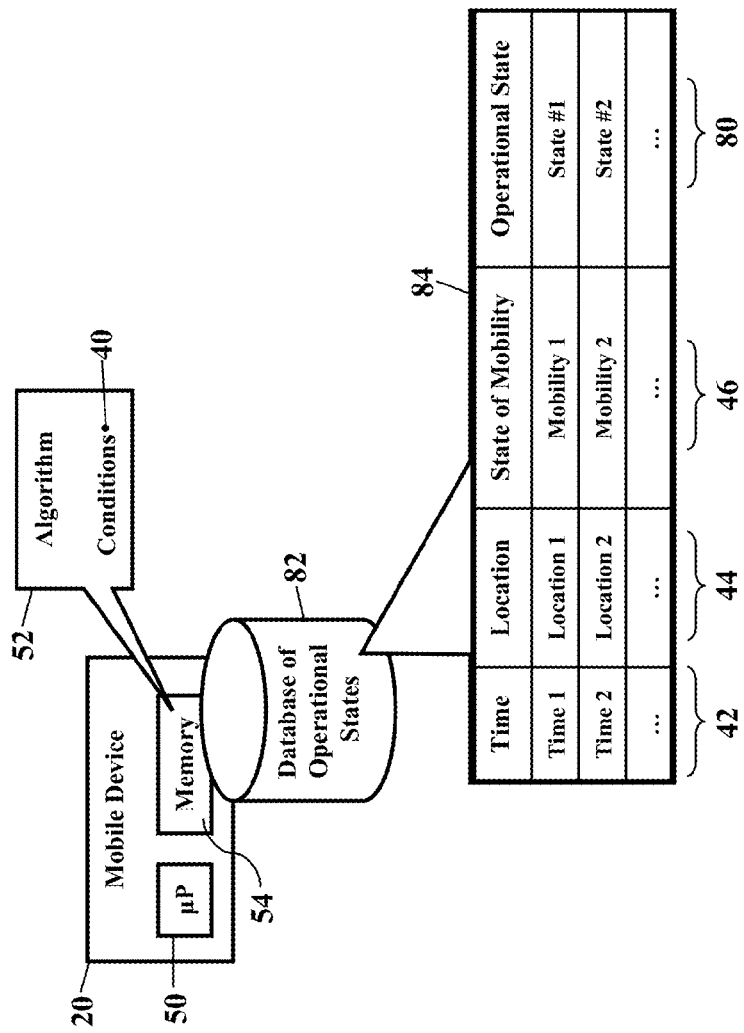
FIG. 4 is a schematic illustrating operational states, according to exemplary embodiments.

FIG. 4 is a schematic illustrating operational states 80, according to exemplary embodiments. Once the algorithm 52 determines the one or more conditions 40, the algorithm determines the operational state 80 for the mobile device 20. That is, the algorithm 52 analyzes the conditions 40 (e.g., the time 42 of day, the location 44, and the state 46 of mobility) and concludes how best to characterize the operational state 80 for the mobile device 20. For example, the algorithm 52 may query a database 82 of operational states. FIG. 4 illustrates the database 82 of operational states as a table 84 that maps, relates, or associates different combinations of the conditions 40 to different operational states 80. The database 82 of operational states stores different operational states for different combinations of the conditions 40 (e.g., the time 42, the location 44, and/or the state 46 of mobility). The database 82 of operational states may thus be populated with entries for many different conditions 40 and their corresponding operational states 80. While FIG. 4 only illustrates a few entries, in practice the database 82 of operational states may contain hundreds, perhaps thousands, of entries. A simple, partial listing of some operational states 80 is provided below:

morning home stationary,
 evening home stationary,
 weekend home stationary,
 work home stationary,
 work office stationary,
 work home market driving,
 work visiting market driving,
 non-work home market driving,
 non-work visiting market driving,
 work home market passenger,
 non-work visiting market passenger,
 non-work home market walking, and/or
 non-work visiting market walking.

There may be many other operational states 80, depending on how the conditions 40 are categorized, valued, or delineated. Once the algorithm 52 determines the conditions 40, the algorithm 52 queries the database 82 of operational states for the conditions 40. If the conditions 40 match one of the entries in the database 82 of operational states, the algorithm 52 retrieves the corresponding operational state 80.

Figure 5:
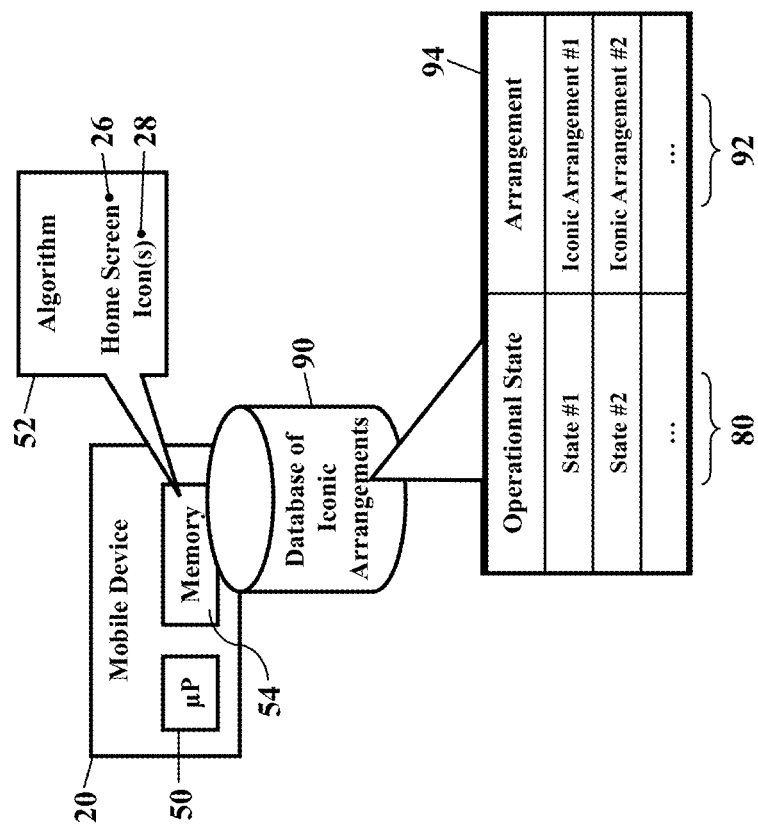
FIG. 5 is a schematic illustrating a database of iconic arrangements, according to exemplary embodiments.

FIG. 5 is a schematic illustrating a database 90 of iconic arrangements, according to exemplary embodiments. Once the algorithm 52 determines the operational state 80, the algorithm 52 may then consult the database 90 of iconic arrangements. The database 90 of iconic arrangements stores iconic arrangements 92 for the icons 28 on the home screen 26 for different operational states 80. FIG. 5, for example, illustrates the database 90 of iconic arrangements as a table 94 that maps, relates, or associates the different operational states 80 to their corresponding iconic arrangement 92. Each entry in the database 90 of iconic arrangements may thus be populated with a different arrangement 92 for the icons 28 on the home screen 26, depending upon the corresponding operational state 80. Once the algorithm 52 determines the operational state 80, the algorithm 52 may query the database 90 of iconic arrangements for the operational state 80. If the operational state 80 of the mobile device 20 matches one of the entries in the database 90 of iconic arrangements, the algorithm 52 retrieves the corresponding arrangement 92 for the icons 28 in the home screen 26. While FIG. 5 only illustrates a few entries, in practice the database 90 of iconic arrangements may contain many entries.

The algorithm 52 then adapts the home screen 26. Once the arrangement 92 is retrieved for the operational state 80, the algorithm 52 then moves the icons 28 on the home screen 26. That is, some icons 28 may be demoted from the home screen 26, and other icons 28 may be promoted to the home screen 26 (as earlier paragraphs explained). The algorithm 52 automatically rearranges the icons 28 to suit the operational state 80 of the mobile device 20. Should the operational state 80 again change, the algorithm 52 may again reconfigure the icons 28 to suit some new operational state 80.

Figure 6:
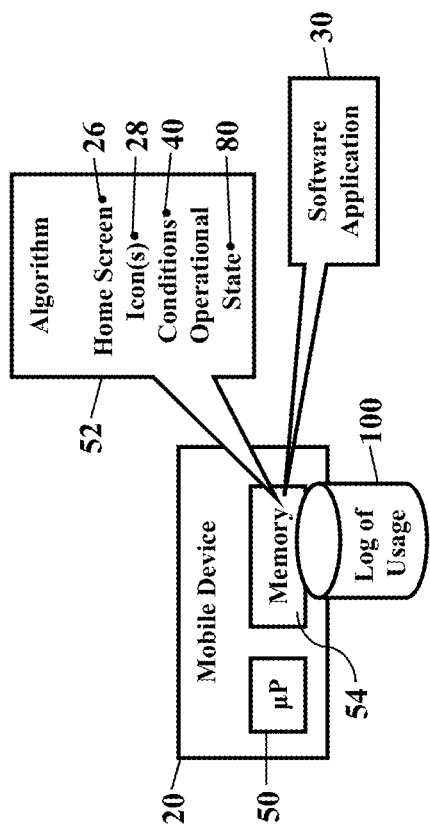
FIG. 6 is a schematic illustrating a log of usage, according to exemplary embodiments.

FIG. 6 is a schematic illustrating a log 100 of usage, according to exemplary embodiments. As the mobile device 20 is used, the algorithm 52 may store usage information in the log 100 of usage. The algorithm 52, for example, may observe and record which software applications 30 are used for any combination of the conditions 40 (e.g., the time 42 of day, the location 44, and the state 46 of mobility). Over time the algorithm 52 learns which ones of the software applications 30 are used most often for each condition 40. For example, the algorithm 52 may monitor how often each software application 30 is started, how often each software application 30 is moved to the home screen 26, and/or how long each software application 30 remains on the home screen 26 for each condition 40. The algorithm 52 thus logs usage for the different operational states 80 of the mobile device 20.

Figure 7:
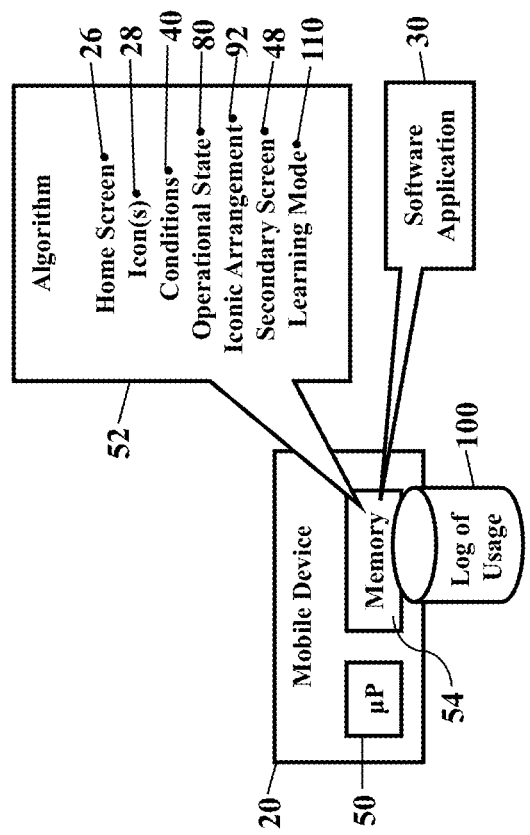
FIG. 7 is a schematic illustrating a learning mode, according to exemplary embodiments.

FIG. 7 is a schematic illustrating a learning mode 110 for the mobile device 20, according to exemplary embodiments. Once the log 100 of usage is built over time, the algorithm 52 may self-configure the icons 28 on the home screen 26. That is, the algorithm 52 may intelligently learn the user's iconic preferences for the different operational states 80. Even though the mobile device 20 may have the arrangements 92 pre-stored or pre-determined (as explained with reference to FIG. 5), the algorithm 52 may tailor the iconic arrangement 92 to best suit the user's personal usage habits. As the log 100 of usage is built, the algorithm 52 may record which software applications 30 are preferred for the different conditions 40. The algorithm 52 may thus tally the usage information and learn what software applications the user prefers for the different operational states 80. The algorithm 52 may then self-determine the arrangement 92 of the icons on the home screen 26, in response to the usage information in the log 100 of usage. That is, the algorithm 52 may configure the icons 28 for a user-friendly home screen 26, according to the operational state 80. Again, the algorithm 52 may arrange the application icons 28 so that the most frequently used software applications 30 are prominently placed on the home screen 26. Lesser-used icons 28 may be removed from the home screen 26 and demoted to the secondary screen 48.

Figure 8:
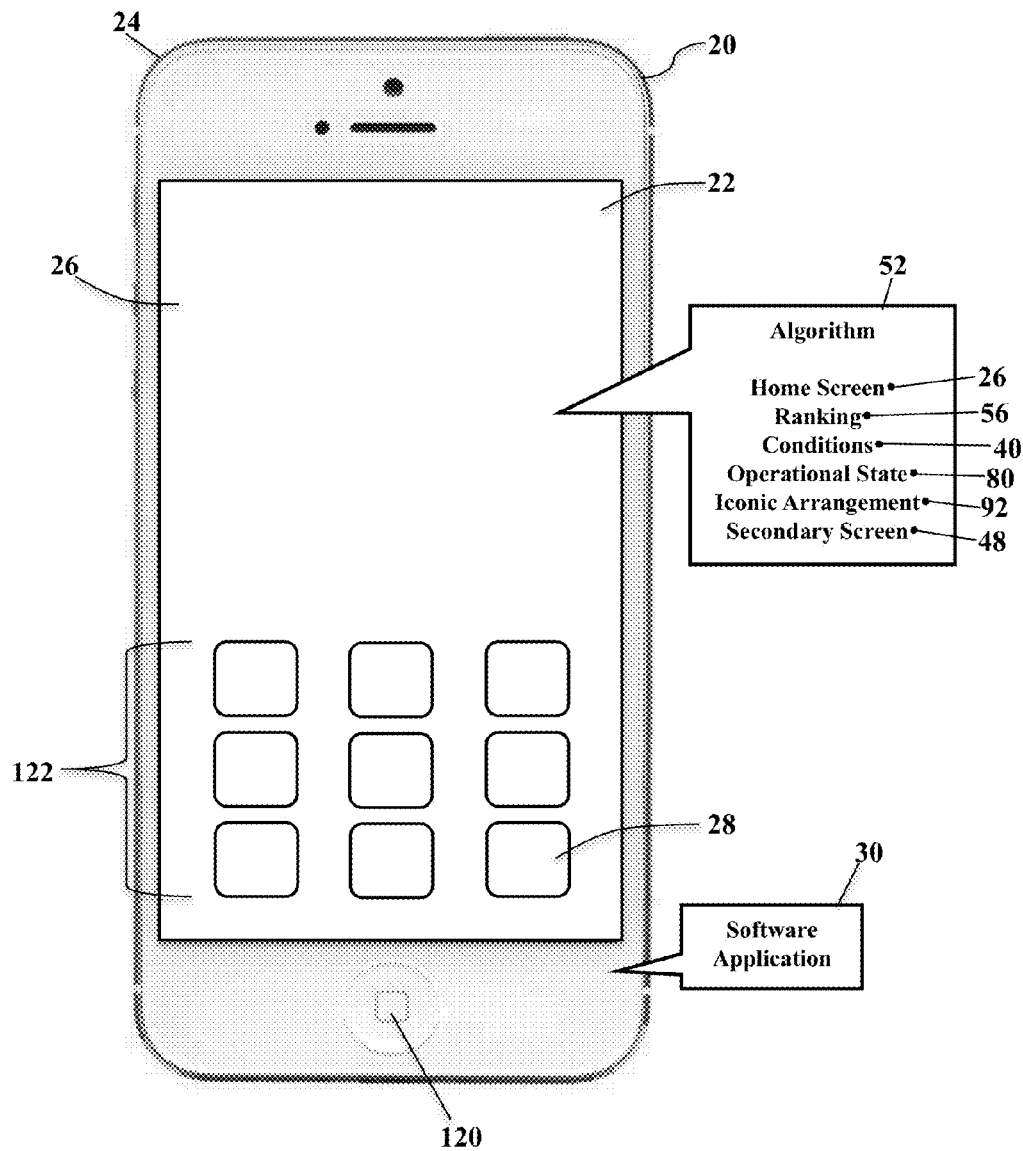
FIG. 8 is a schematic illustrating a home button on a mobile device, according to exemplary embodiments.

FIG. 8 is a schematic illustrating a home button 120 on the mobile device 20, according to exemplary embodiments. When the user touches or depresses the home button 120, the mobile device 20 displays the home screen 26. While the home button 120 may be located at any location on the mobile device 20, FIG. 8 illustrates the home button 120 on a front face of the smart phone 24.

Exemplary embodiments may cluster the icons 28. As the algorithm 52 learns the user's preferences, the algorithm 52 may arrange the icons 28 about the home button 120. That is, once the algorithm 52 determines the most frequently used software application(s) 30 during the operational state 80, the algorithm 52 may arrange the corresponding icons 28 around the home button 120. So, not only are the popular icons 28 promoted to the home screen 26, but the popular icons 28 may also be clustered around the home button 120. The popular icons 28 during the operational state 80 are thus arranged for easy access about the home button 120.

FIG. 8 thus illustrates a grid 122 of the icons 28. Once the icons 28 for the home screen 26 are determined (according to the operational state 80), the algorithm 52 may arrange the application icons 28 on the home screen 26. FIG. 8 illustrates the application icons 28 arranged in the grid 122, with each individual icon 28 having a row and column position. Each position in the grid 122 corresponds to a rank in the ranking 56. That is, once the algorithm 52 determines which icons 28 are promoted to the home screen 26, the algorithm 52 may further generate assign the icon 28 to a position in the grid 122, according to the ranking 56.

The ranking 56 may start near the home button 120. As the application icons 28 are ranked, the most popular icons 28 may be reserved for positions closest to the home button 120. That is, a first position in the ranking 56 may correspond to one of the row/column positions that is closest to the home button 120. Consider, for example, when the operational state 80 is "morning home stationary," the user may popularly text with friends and workers. A text messaging icon 28, then, may be assigned the first position in the grid 122. Next popular may be a news-feed application, which is assigned a second position in the grid 122. The third most popular application icon 28 is assigned a fourth position, a fifth most popular application icon 28 is assigned a fifth position, and so on. The application icons 28 may thus be arranged according to the ranking 56, with the more popular software application icons 28 reserved for the closest positions to the home button 120. Because the icons 28 are positioned near the home button 120, the icons are within easy reach of the user's thumb (as later paragraphs will explain).

Figure 9:
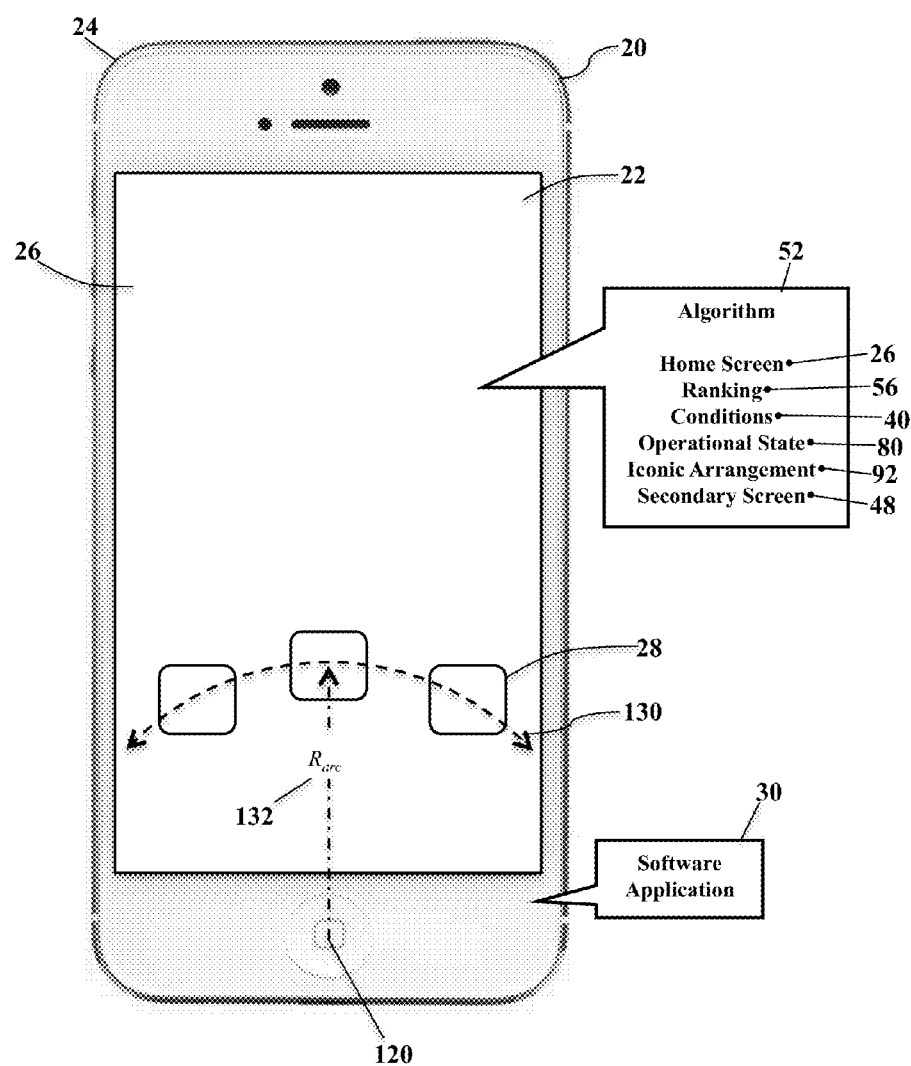
FIGS. 9-10 are schematics illustrating radial distances from the home button, according to exemplary embodiments.
Figure 10:
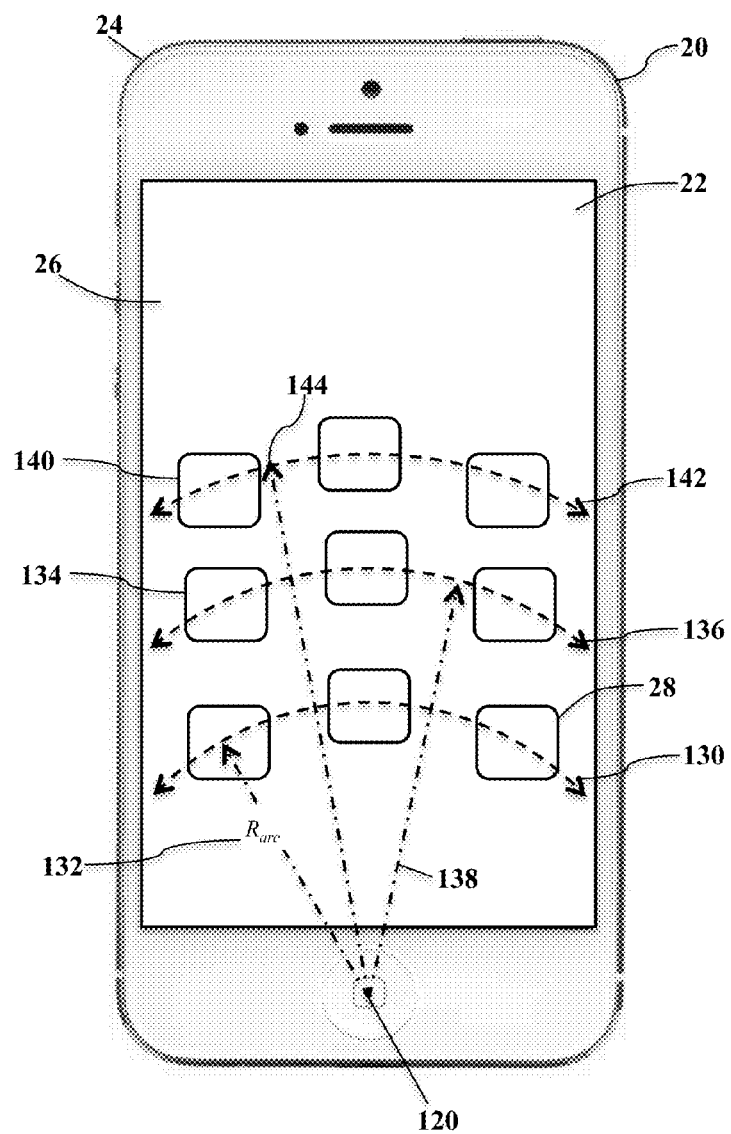

FIGS. 9-10 are schematics illustrating radial distances from the home button 120, according to exemplary embodiments. Here, the algorithm 52 generates the ranking 56 of the software applications 30, and the corresponding icons 28 are still clustered about the home button 120. Yet, here the icons 28 are arranged according to a radial distance from the home button 120. That is, the most popular icons 28 may be reserved for positions in an arc 130 that are closest to the home button 120. The arc 130 has a corresponding radius $R_{arc}$ (illustrated as reference numeral 132) about which the icons 28 are aligned. The radius 132 may be determined from the home button 120. As FIG. 10 illustrates, less popular icons 134 may be aligned on a second arc 136 that corresponds to a greater, second radius 138. The least popular icons 140 may be aligned on a third arc 142 that corresponds to a still greater, third radius 144. Exemplary embodiments may thus rank and arrange the icons 28 about successive radial arcs from the home button 120. This radial arrangement positions the icons 28 near the home button 120, within easy reach of the user's thumb.

Figure 11:
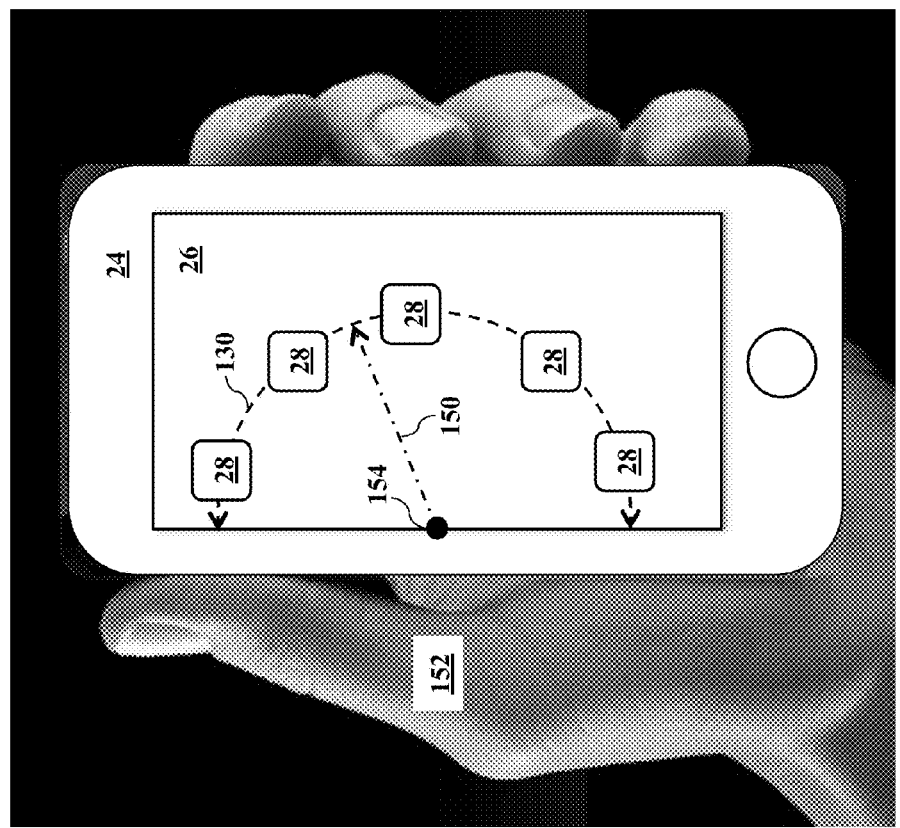
FIGS. 11-14 are schematics illustrating a thumb radius, according to exemplary embodiments.

FIGS. 11-14 are schematics illustrating a thumb radius 150, according to exemplary embodiments. As the reader will recognize, FIG. 11 illustrates one-handed operation of the smart phone 24. The smart phone 24 is held in a portrait orientation and cradled in a palm of the user's hand. The user's thumb 152 reaches to select the icons 28 on the home screen 26. Here, though, the application icons 28 may be radially arranged with respect to the thumb radius 150 of the user's thumb 152. The ranked icons 28 may thus be positioned to always be within easy reach of the user's thumb 152.

FIG. 11 thus illustrates another radial arrangement of the icons 28. The icons 28 may again be positioned along the arc 130. Here, though, the user's thumb radius 150 determines the arc 130. Even though one-handed operation is common, different people's hands come in different sizes. That is, our hands are not equal in size. So, the radial arrangement of the icons 28 may be adjusted to suit the length of the user's thumb 152.

Figure 12:
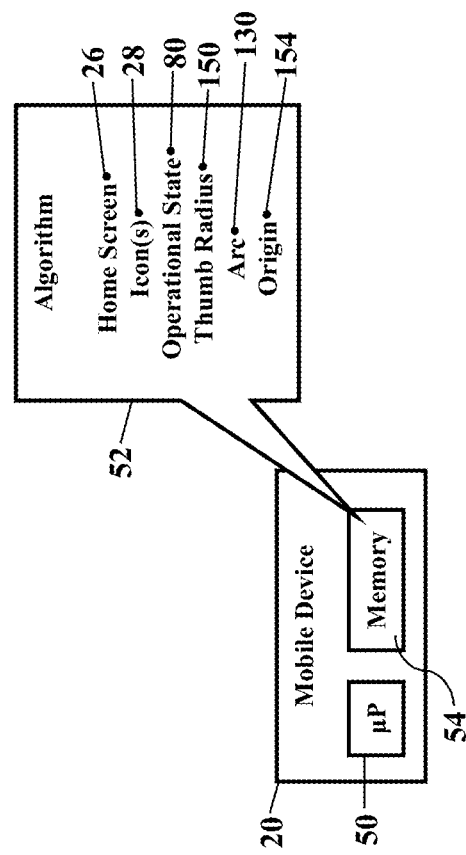

FIG. 12 also illustrates the thumb radius 150. Once the algorithm 52 determines which icons 28 should be displayed (according to the operational state 80), the algorithm 52 positions the icons 28 on the home screen 26. The algorithm 52 retrieves the user's thumb radius 150 from the memory 54, mathematically plots the arc 130, and aligns the icons 28 to the arc 130. The icons 28 for the operational state 80 are thus radially aligned within easy reach of the user's thumb (illustrated as reference numeral 152 in FIG. 11).

FIGS. 11 and 12 also illustrates an origin 154 for the thumb radius 150. The origin 154 is a reference position from which the arc 130 is centered. That is, the user's thumb radius 150 is calculated from the origin 154, thus determining where on the home screen 26 that the icons 28 are radially aligned. The origin 154 may thus be selected by the user to ensure the radial alignment coincides with the user's thumb 152. Exemplary embodiments, then, may permit the user to select the origin 154 from which the arc 130 is defined. The user, for example, may touch or tap a location on the home screen 26 (if touch sensored) to define the origin 154. The user may specify coordinates on the home screen 26 for the origin 154. Touch sensors on a body or shell of the mobile device 20 may even determine the origin 154, as the mobile device 20 is held in the user's hand. Regardless, the user may personalize the radial arrangement to suit her one-handed operation.

Figure 13:
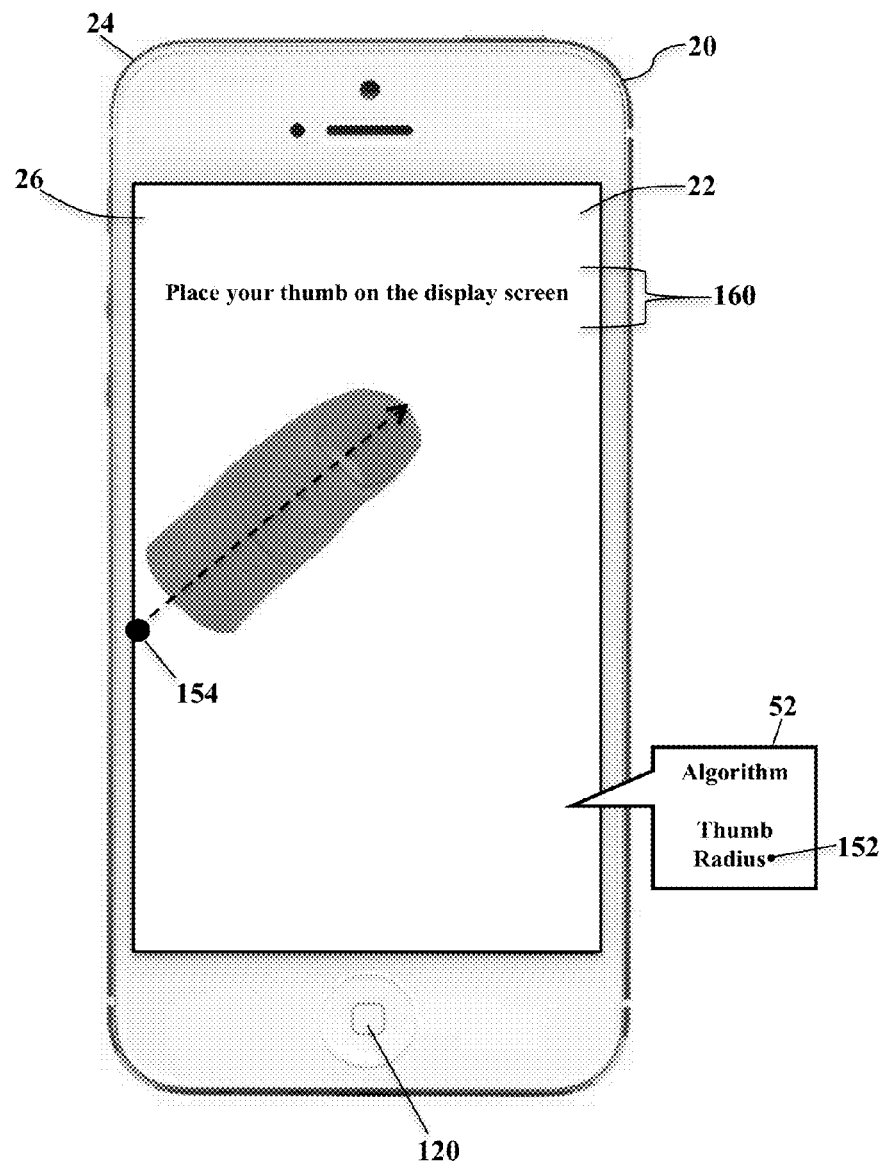

FIG. 13 illustrates measurement of the user's thumb radius 150. Before the icons 28 may be radially arranged with respect to the user's thumb (as FIGS. 11-12 illustrated), the length of the user's thumb 152 may be needed. The algorithm 52 may present a prompt 160 for measuring the user's thumb radius 150. The prompt 160 instructs the user to place her thumb on the display device 22. The algorithm 52 may then cause the mobile device 20 to capture a full-size image of the user's thumb 152, from which the thumb radius 150 is determined by image analysis. Alternatively, if the mobile device 20 includes a touch screen, the algorithm 52 may use pressure points or inputs to detect the length of the user's thumb 152. Exemplary embodiments, however, may use any measures of measuring the length of the user's thumb 152, including manual entry. Regardless, once the user's thumb radius 150 is known, the algorithm 52 may use the thumb radius 152 to align the icons (as earlier paragraphs explained).

Figure 14:
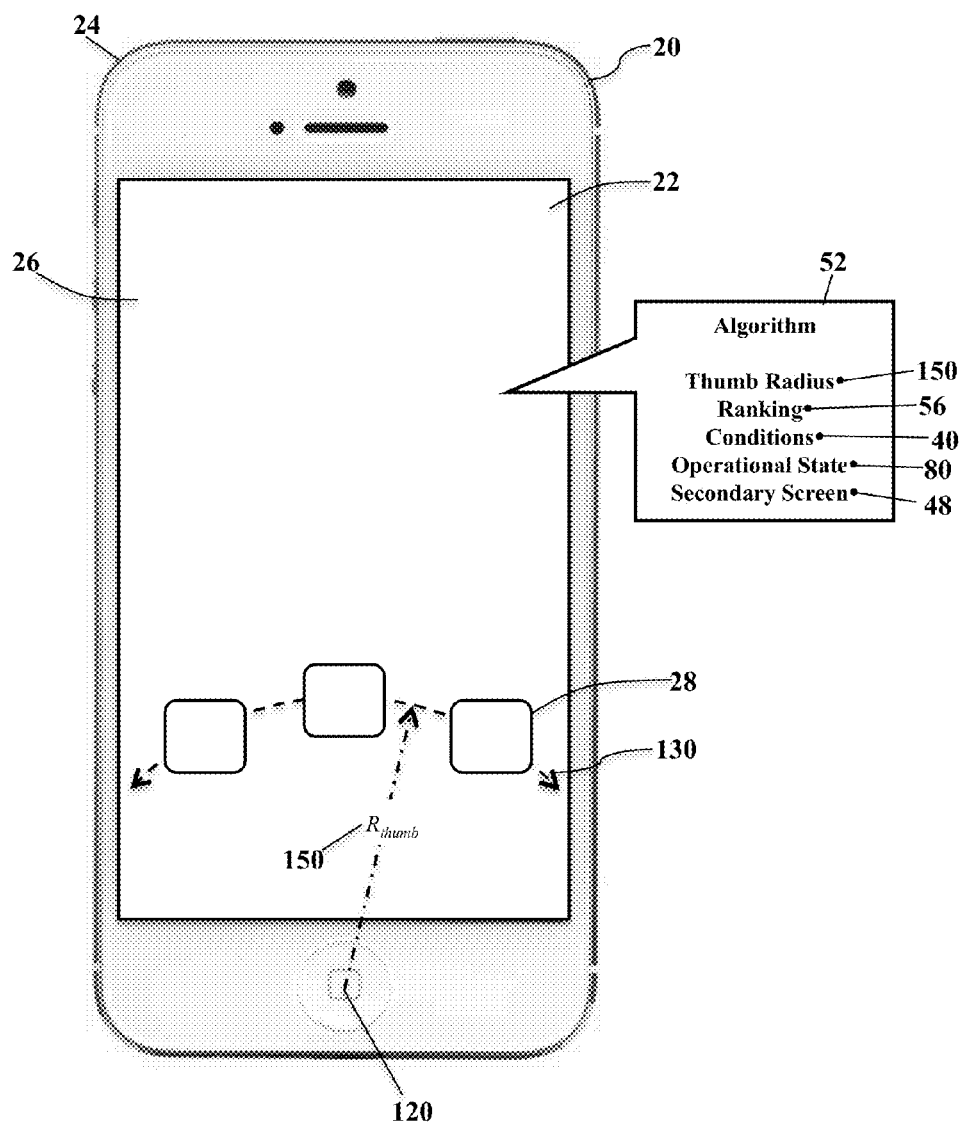

FIG. 14 also illustrates radial alignment from the home button 120. Here, though, the icons 28 may be radially arranged from the home button 120, according to the user's thumb radius 150. The algorithm 52 retrieves the user's thumb radius 150 and aligns the most popular icons 28 within the arc 130 defined by the thumb radius 150 from the home button 120. As such, the most popular icons 28 are within easy reach of the user's thumb during single-handed use. Exemplary embodiments may even arrange the icons 28 along multiple arcs (as explained with reference to FIG. 10). Some of the multiple arcs may have a radius less than or equal to the user's thumb radius 150, measured from the home button 120. Less popular icons 28, or even least popular icons, may be arranged along an arc having a radius greater than the user's thumb radius 150 from the home button 120. The popular icons 28, in other words, may be arranged within easy reach of the home button 120, but less popular icons 28 may be positioned beyond the user's thumb radius 150.

Figure 15:
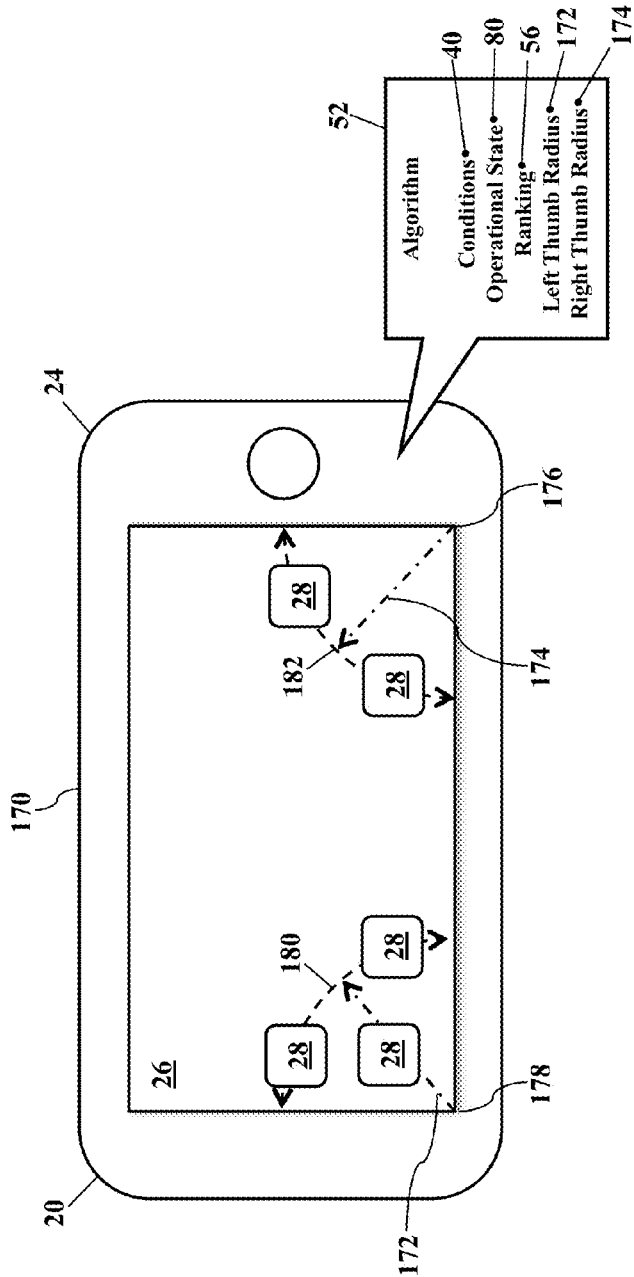
FIG. 15 is a schematic illustrating a landscape orientation, according to exemplary embodiments.

FIG. 15 is a schematic illustrating a landscape orientation 170, according to exemplary embodiments. As the reader understands, the mobile device 20 may be oriented for two-handed operation. When the mobile device 20 is held in the landscape orientation 170, the application icons 28 may be arranged within easy reach of the user's left thumb and/or the user's right thumb. That is, as the ranking 56 is generated, some of the application icons 28 may be arranged within a left thumb radius 172. Other icons 28 may be arranged within a right thumb radius 174. If the user is right-handed, for example, the most popular icons 28 may be clustered within the right thumb radius 174 about a right corner 176 of the display device 22. Less popular icons 28 may be arranged within the left thumb radius 172 about a left corner 178 of the display device 22. A left-handed user, of course, may prefer a vice versa arrangement. Regardless, the icons 28 may be arranged within arcs 180 and 182, within easy of the user's respective left and right thumbs.

Figure 16:
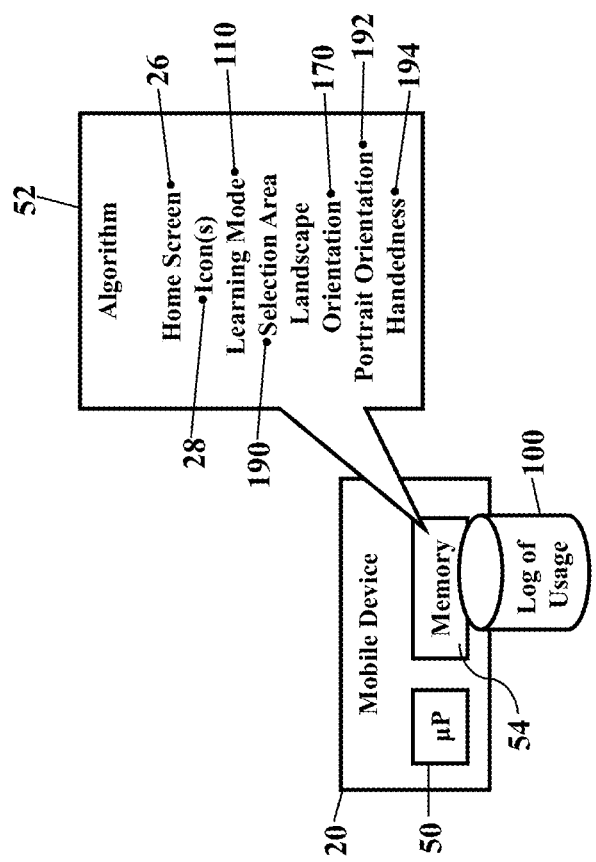
FIGS. 16-17 are schematics further illustrating the learning mode, according to exemplary embodiments.
Figure 17:
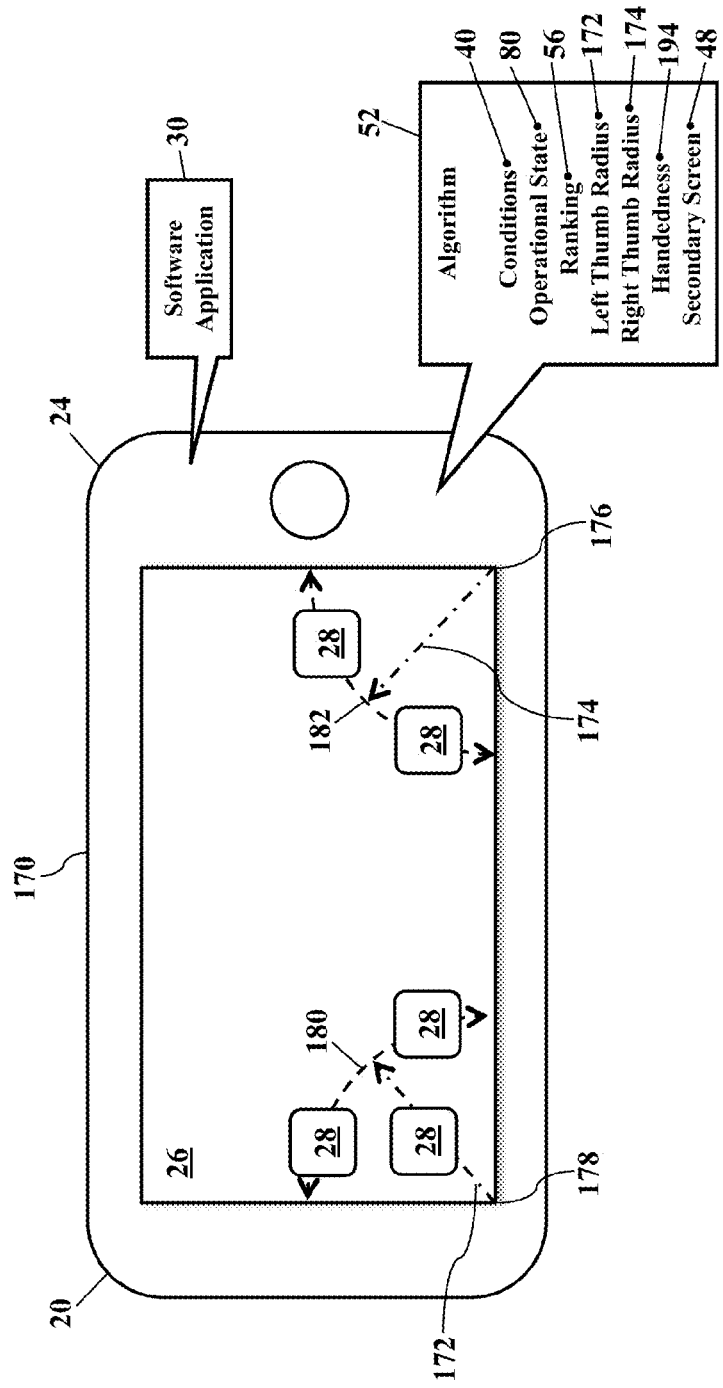

FIGS. 16-17 are schematics further illustrating the learning mode 110 for the mobile device 20, according to exemplary embodiments. As the log 100 of usage is built over time, the algorithm 52 may further record a selection area 190 for each icon 28. That is, when any icon 28 is selected, the algorithm 52 may record whether the mobile device 20 was in the landscape orientation 170 or in the portrait orientation 192. The selection area 190 may also record a quadrant, zone, or region of the home screen 26 from which the icon 28 was selected. The selection area 190 thus allows the algorithm 52 to infer whether the user's left thumb or right thumb made the selection. For example, if the icon 28 is selected from the lower right corner portion of the home screen 26, then the algorithm 52 may determine that the user's right thumb likely made the selection. If the icon 28 is selected from the lower left corner portion of the home screen 26, then the algorithm 52 may determine that the user's left thumb made the selection. That is, the algorithm 52 may associate a handedness 194 with each icon 28 recorded in the log 100 of usage.

FIG. 17 further illustrates the iconic arrangement. When the mobile device 20 is held in the landscape orientation 170, the application icons 28 may be arranged according to the handedness 194. Once the algorithm 52 generates the ranking 56 for the corresponding operational state 80, the application icons 28 may be arranged according to the ranking 56 and clustered according to the handedness 194. For example, the most popular icons 28 with right-handedness 194 may be arranged within the right thumb radius 174 about the right bottom corner 176 of the home screen 26. The most popular icons 28 with left-handedness 194 may be arranged within the left thumb radius 172 about the left bottom corner 178 of the home screen 26. Once again, then, the icons 28 may be arranged within the arcs 180 and 182 about the preferred thumbs for easy access.

Some examples of the ranked icons 28 are provided. Consider, for example, that some software applications 30 may be unsafe for some operational states 80. When the algorithm 52 determines the operational state 80 involves driving, some software applications 30 (such as email and text) may be categorized as unsafe or even prohibited. The algorithm 52, then, may deliberately demote the corresponding application icons 28 to the secondary screen 48. Other software applications 30, however, may be categorized as safe driving enablers, such as voice control and telephony applications. The corresponding safe application icons 28 may be promoted to prominent, high-ranking positions on the home screen 26.

Figure 18:
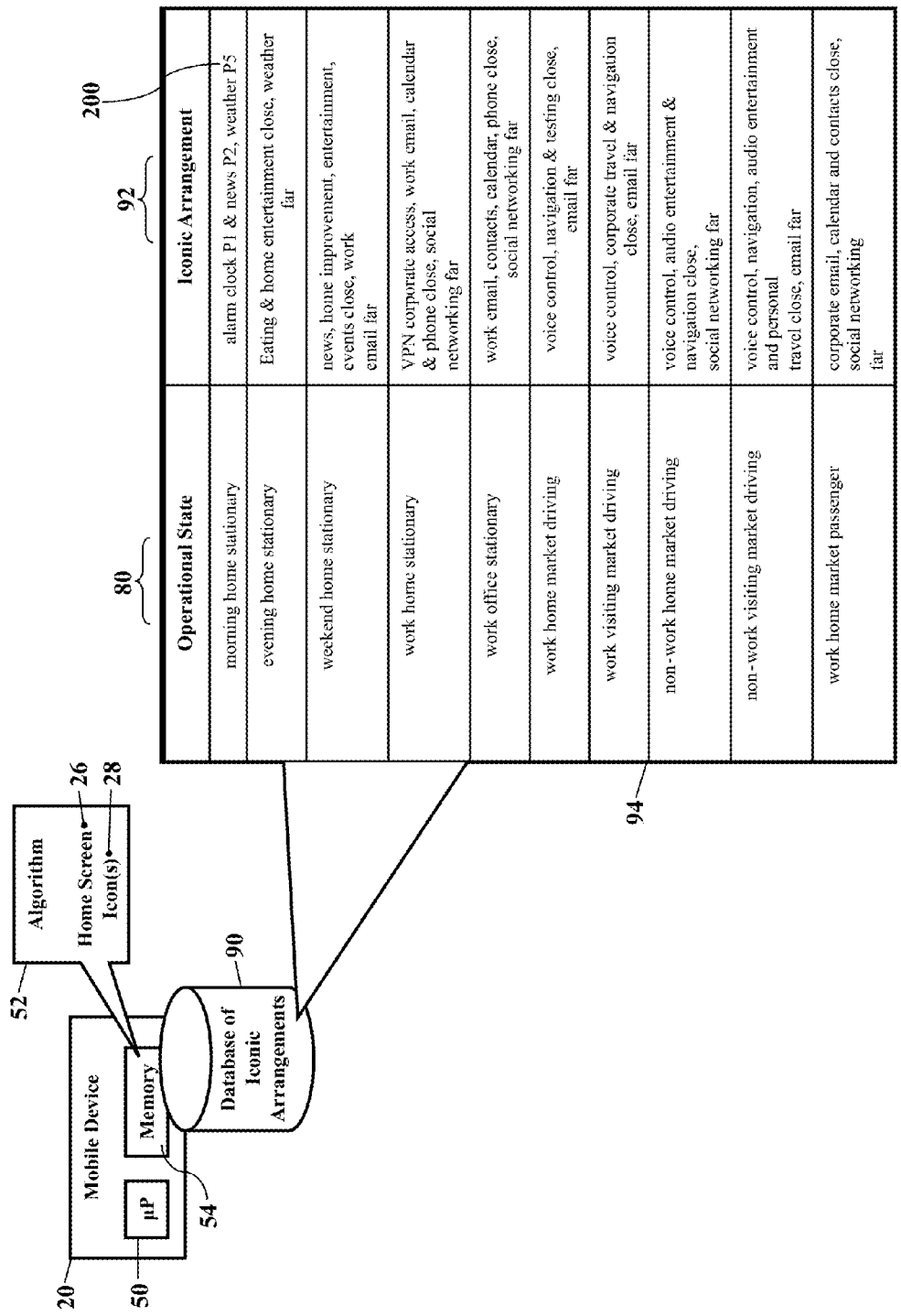
FIG. 18 is a schematic further illustrating the database of iconic arrangements, according to exemplary embodiments.

FIG. 18 is a schematic further illustrating the database 90 of iconic arrangements, according to exemplary embodiments. FIG. 18 again illustrates the database 90 of iconic arrangements as the table 94 that associates the different operational states 80 to their corresponding iconic arrangements 92. Here, though, the iconic arrangements 92 may be augmented with and the positional ranking 200. That is, once the software applications 30 are ranked, the algorithm 52 may assign iconic positions on the home screen 26. Each icon 28 may have its positional ranking 200 expressed as the row and column (as explained with reference to FIG. 8). Each icon 28, however, may also be radially arranged with respect to the home button 12 and/or the user's thumb radius 150 (as explained with reference to FIGS. 9-17). Referencing FIG. 18, the operational state 80 of "morning home stationary" has an alarm clock icon at positional ranking "P1" and a news icon at positional ranking "P2." A weather icon is moved to positional ranking "P5." FIG. 18 thus illustrates examples of entries in the database 90 of iconic arrangements. Again, FIG. 18 only illustrates several entries. In practice the database 90 of iconic arrangements may contain hundreds, perhaps thousands, of entries.

The algorithm 52 thus dynamically builds the home screen 26. Any time the operational state 80 changes, the home screen 26 may adapt throughout the day as operational states 80 change. For example, should the mobile device 20 pair with a BLUETOOTH® interface (perhaps for hands-free operation in a vehicle), and/or detect the vibration (as explained with reference to FIG. 3), the algorithm 52 may reconfigure the home screen 26. That is, the home screen 26 may change from a "morning home stationary" arrangement 92 to a "non-work home market driving" arrangement 92. Should an office WI-FI® network be detected, perhaps without low-frequency vehicular sounds and the vibration 66, then the algorithm 52 may further change the home screen 26 to a "work office stationary" arrangement 92. Should the mobile device 20 again pair with the BLUETOOTH® interface (again for hands-free operation in a vehicle), and/or detect once again detect vibration 66, then the algorithm 52 may again change the home screen 26 to a "non-work home market driving" arrangement 92. If a home network is detected (perhaps from a home FEMTO identifier), perhaps without recognized vehicular vibration 66 and low-frequency sounds, the home screen 26 may reconfigure to an "evening home stationary" arrangement 92. Finally, in the evening of the day, the home screen 26 may reconfigure to a "non-work home market walking" arrangement 92 in response to slow, cyclic vibration 66 while the user walks a dog, and the home FEMTO is out of range. While only these few examples are provided, many more combinations are possible, depending on the operational states 80.

Figure 19:
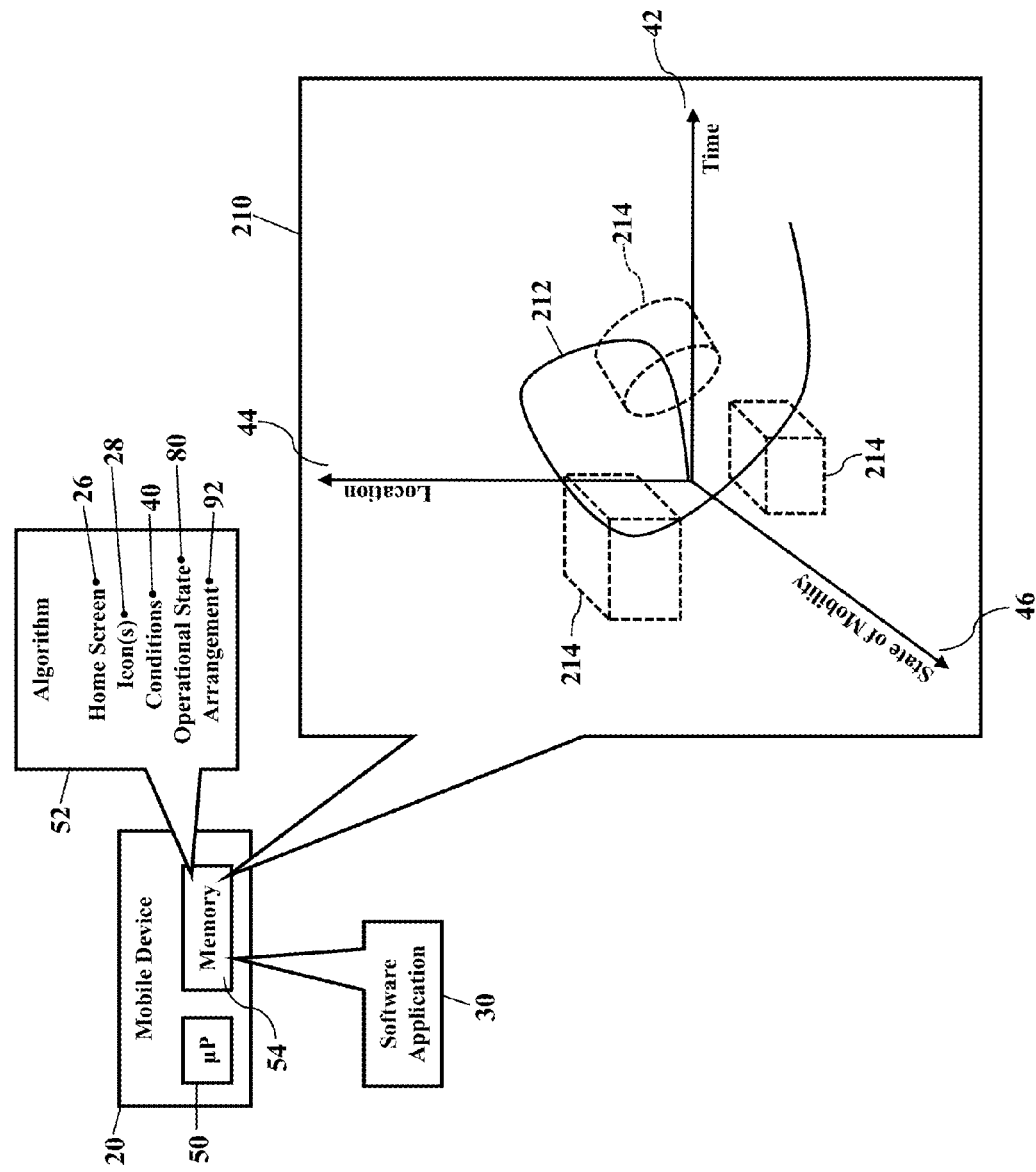
FIG. 19 is a graphical illustration of a three-dimensional mapping, according to exemplary embodiments.

FIG. 19 is a graphical illustration of a three-dimensional mapping 210 of the conditions 40, according to exemplary embodiments. While the algorithm 52 may dynamically arrange the icons 28 based on only one of the conditions 40, exemplary embodiments may dynamically arrange based on any combination of the time 42 of day, the location 44, and the state 46 of mobility. FIG. 19 thus illustrates the three-dimensional mapping 210 of the conditions 40. As this disclosure above explains, the icons 28 on the home screen 26 are rarely used under the same conditions 40. Each specific software application 30 may only be useful for certain combinations of the conditions 40. Exemplary embodiments, then, detect the conditions 40 and consult the three-dimensional mapping 210 to determine the operational state 80.

FIG. 19 thus graphs the conditions 40. The different conditions 40 (e.g., the time 42 of day, the location 44, and the state 46 of mobility) may be plotted along different orthogonal coordinate axes. The location 44 may be quantified from some reference location, such as the distance from the user' home address. Once the algorithm 52 determines the time 42 of day, the location 44, and the state 46 of mobility, the algorithm 52 consults the three-dimensional mapping 210. One or more state functions 212 may be defined to determine the operational state 80. That is, the state function 212 may be expressed as some function of the time 42, the location 44, and the state 46 of mobility. Different three-dimensional geometrical regions 214 of the three-dimensional mapping 210 may also define different, corresponding operational states 80. When the current the time 42 of day, the location 44, and the state 46 of mobility are plotted, the final coordinate location is matched to one of the geometrical regions 214 to determine the operational state 80. Regardless, the algorithm 52 may consult the three-dimensional mapping 210 for the time 42 of day, the location 44, and/or the state 46 of mobility. The algorithm 52 retrieves the corresponding operational state 80 and then determines the arrangement 92 (as earlier paragraphs explained).

Figure 20:
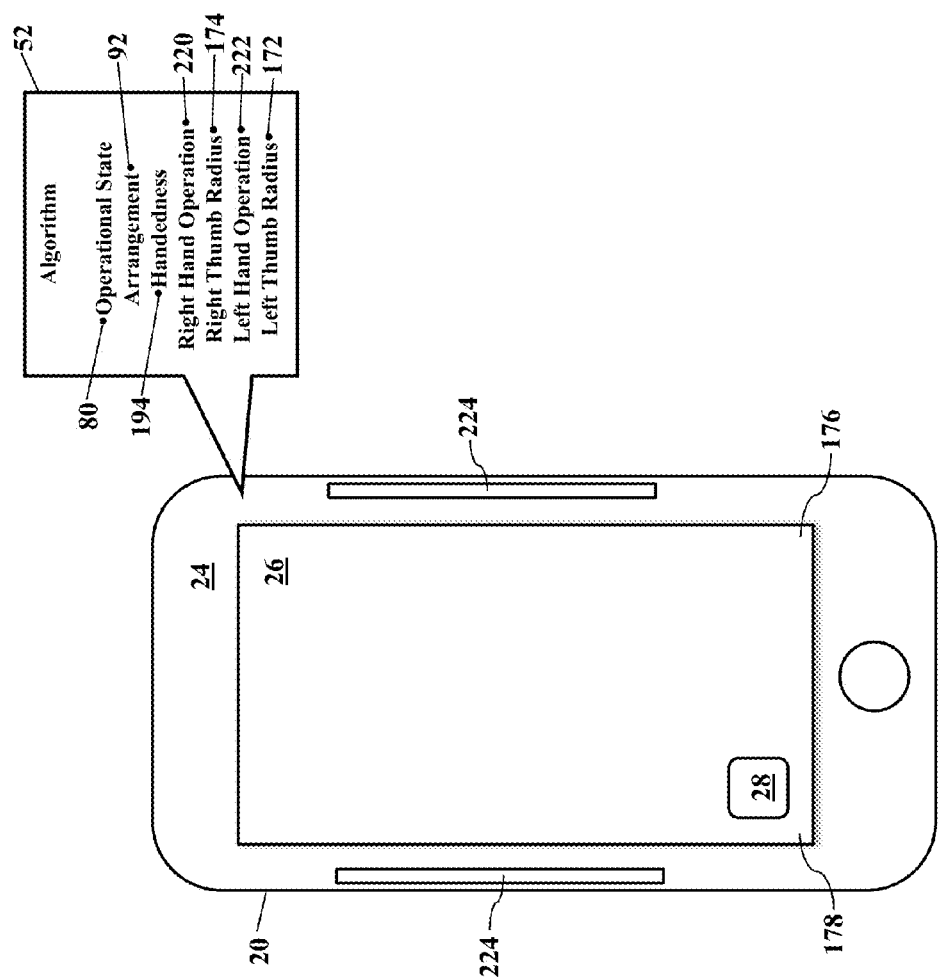

FIGS. 20-21 are schematics further illustrating the handedness 194, according to exemplary embodiments. Here the application icons 28 displayed on the home screen 26 may be configured for right-hand operation 220 or for left-hand operation 222. That is, the icons 28 may be rearranged for left hand use or for right hand use. A left-handed user, for example, may have difficulty reaching, or selecting, an icon 28 arranged outside the left thumb radius 172. Similarly, a right-handed user likely has difficulty selecting icons positioned beyond the right thumb radius 174. These difficulties may be especially acute for larger display screens held in smaller hands. Over-extension may produce very different experiences between left- and right-handed users. Most users, in other words, may be dissatisfied with the same iconic arrangement 92.

Exemplary embodiments may thus adapt to the handedness 194. As the mobile device 20 is held, the algorithm 52 may detect whether the mobile device 20 is held in the user's right hand or in the user's left hand. The algorithm 52 may then arrange the icons 28 on the home screen 26 to suit the right-handed operation 220 or the left-hand operation 222. When the mobile device 20 is held in the right hand, the algorithm 52 may cluster or arrange higher-ranking icons 28 to the user's right thumb. Conversely, the higher-ranking icons 28 may be arranged to the user's left thumb for the left-hand operation 222.

FIG. 20 illustrates touch sensors 224. The touch sensors 224 detect the number and locations of contact points with the user's fingers and thumb. As the mobile device 20 is held, the user's fingers and thumb grasp and cradle the mobile device 20. The touch sensors 224 detect the number and pattern of contact points between the hand and the mobile device 20. While the touch sensors 224 may be located anywhere on the mobile device 20, FIG. 20 illustrates the touch sensors 224 along left and right sides. The number of the contact points, and the pattern of those contact points, may thus be used to determine the right-handed operation 220 or the left-hand operation 222. For example, when the mobile device 20 is held in the user's left hand, the touch sensors 224 may detect the user's palm as a left-side, single, wide contact point. The touch sensors 224 may also detect the user's left fingers as two or more narrow contact points on the right side of the mobile device 20. Should the mobile device 20 be held in the right hand, the user's palm appears as a single, wide contact point on the right and the fingers appear as two or more narrow contact points on the left.

Exemplary embodiments may then arrange the icons 28. The algorithm 52 determines the operational state 80 and retrieves the corresponding arrangement 92. However, the algorithm 52 may then adapt the arrangement 92 according to the handedness 194. If the left-hand operation 222 is determined, the icons 28 may be arranged about the user's left thumb. That is, the icons 28 may be arranged within the user's left thumb radius 172 (as explained with reference to FIGS. 15-17). If the right-handed operation 220 is determined, the icons 28 may be arranged within the user's right thumb radius 174 (again as explained with reference to FIGS. 15-17). Exemplary embodiments may thus rearrange the home screen 26 such that higher-ranking icons 28 are closest to the user's preferred thumb for easy selection.

FIG. 20 illustrates an arrangement for morning habits. If the operational state 80 is "morning home stationary," an alarm clock application may be high ranking. Exemplary embodiments may thus position the corresponding application icon 28 in the bottom left corner 178 for the left-hand operation 222. This position puts the high-ranking icon 28 within easy reach of the user's left thumb. A right-handed user, however, may prefer the icon 28 in the bottom right hand corner 176 for the right-handed operation 220. Moreover, this positioning also reduces the area over which the display device 22 is blocked by the user's thumb. As the user's thumb reaches to select the icons 28, the user's thumb and/or hand may block significant portions of the display device 22. Positioning according to the handedness 194 may thus improve visibility and reduce incorrect or accidental selection of the wrong icon 28.

FIG. 21 is another schematic illustrating the database 90 of iconic arrangements, according to exemplary embodiments. The database 90 of iconic arrangements again associates the different operational states 80 to their corresponding iconic arrangements 92. Here, though, the iconic arrangements 92 may be augmented with the handedness 194. The algorithm 52 queries the table 94 for the operational state 80 and retrieves the corresponding iconic arrangement 92 of the home screen 26, along with the handedness 194. The algorithm 52 then arranges the icons 28 on the home screen 26, as this disclosure explains.

The algorithm 52 will improve with time. As the algorithm 52 gains experience with the user, the algorithm 52 may determine that the user always, or usually, prefers the right-handed operation 220 or the left-hand operation 222. The icons 28 on the home screen 26 may thus be arranged according to habitual handedness 194. The algorithm 52, of course, may determine how the mobile device 20 is currently held and adapt to the current handedness 194. Even though the left-hand operation 222 may be habitually preferred, the icons 28 may be rearranged when currently held in the user's right hand.

Figure 22:
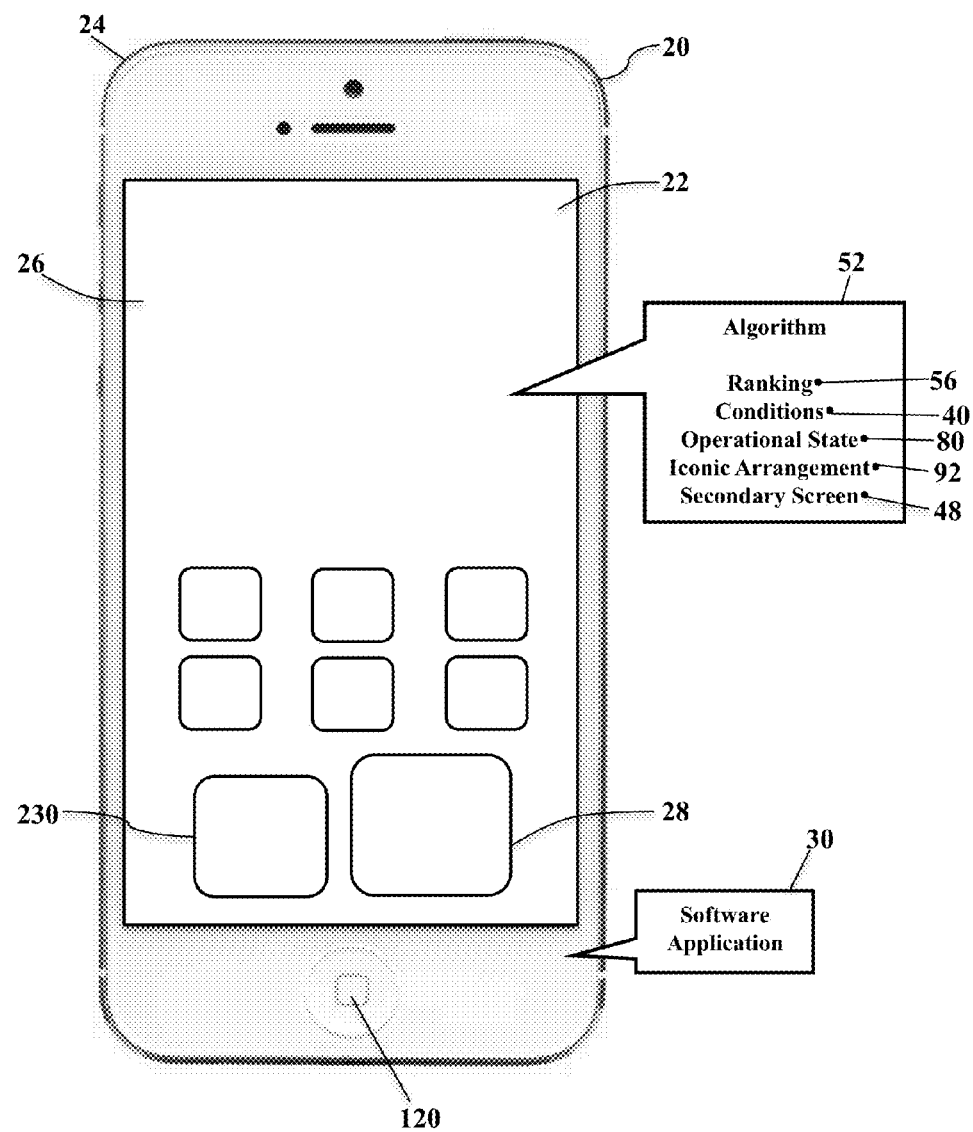
FIGS. 22-24 are schematics illustrating adaptation of sizing, according to exemplary embodiments.
Figure 23:
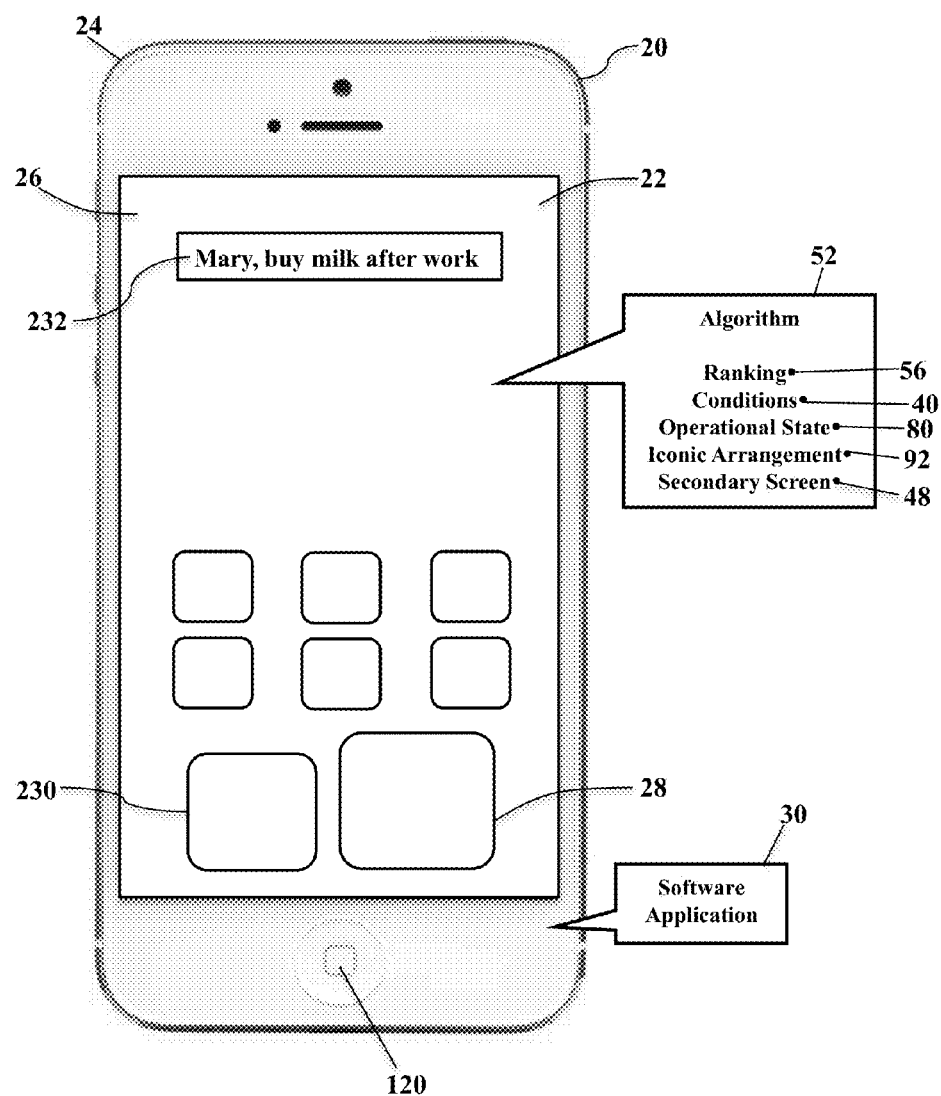
Figure 24:
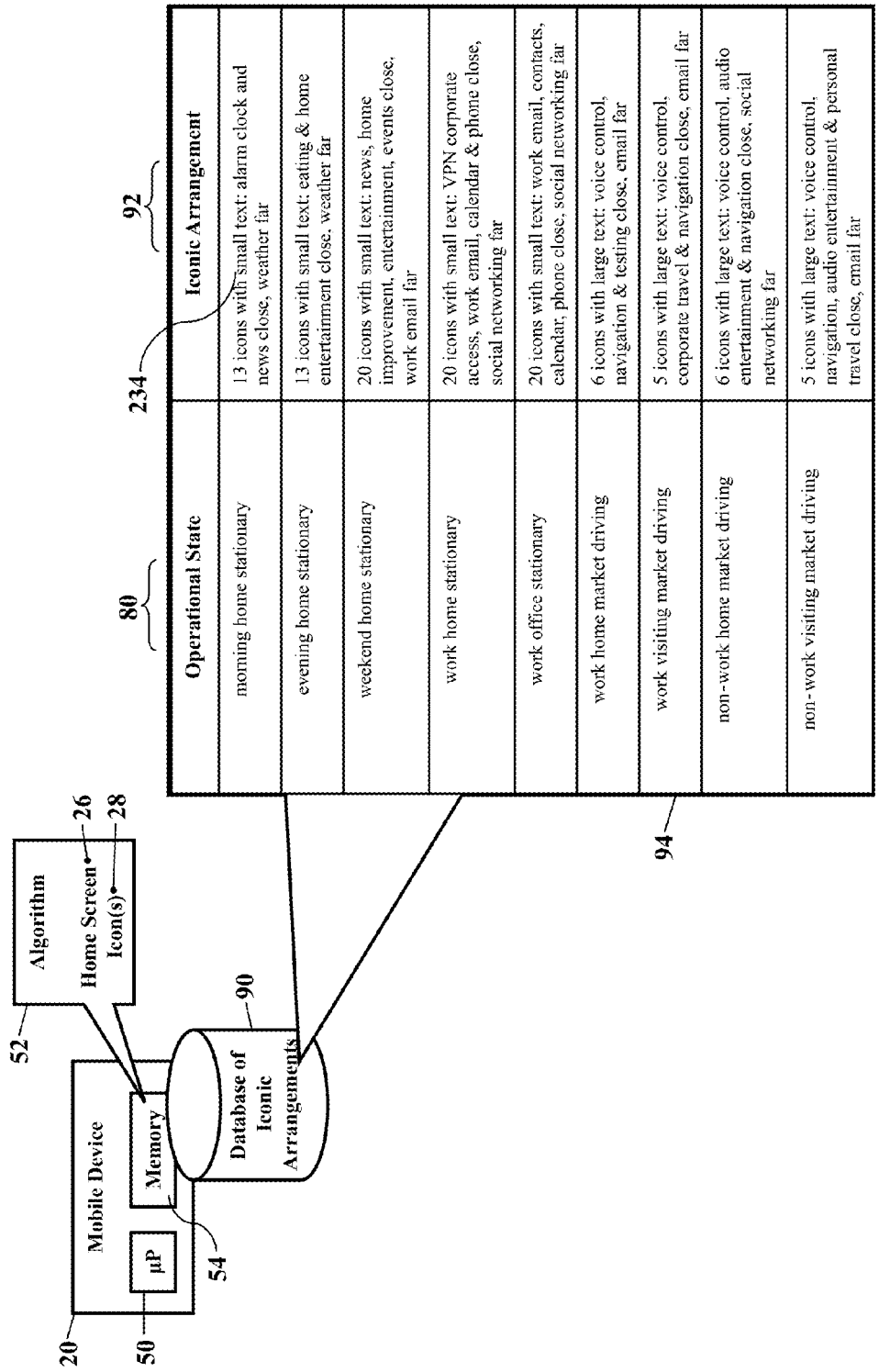

FIGS. 22-24 are schematics illustrating adaptation of sizing, according to exemplary embodiments. Here a size 230 of an icon 28 may adapt, according to the operational state 80. That is, the size 230 of any of the icons 28 may increase, or decrease, in response to the operational state 80. High-ranking icons 28, for example, may have a larger size 230 than lesser ranking icons 28. Indeed, the highest-ranking icon 28 (perhaps representing a most popular software application 30) may be sized greater than all other icons 28 displayed by the home screen 26. Rarely used icons 28 may be reduced in the size 230, thus allowing the home screen 26 to be dominated by the popular icons 28.

The size 230 of an individual icon 28 may determine its user friendliness. Screen size, resolution, and user dexterity are among the various factors that limit the number and user-friendliness of the application icons 28 that can fit on the home screen 26. Indeed, with the small display device 22 of the smart phone 24, user friendliness becomes even more of an important consideration. For example, small sizes for the icons 28 may be well suited for stationary use (e.g., when the mobile device 20 and user are not separately moving or shaking). However, small sizes for the icons 28 are not suited during mobile situations when the user and the mobile device 20 are separately moving or shaking. The state 46 of mobility, in other words, may cause small icons to be difficult to read and select. Accidental, unwanted selection of an adjacent icon often results.

Sizing may thus adapt. When the algorithm 52 determines the operational state 80 (from the conditions 40), the algorithm 52 retrieves the corresponding arrangement 92. However, the algorithm 52 may also adapt the size 230 of any icon 28 according to the operational state 80. For example, if the user is walking, the algorithm 52 may enlarge the four (4) highest ranking 56, most important application icons 28. Indeed, lesser ranking 56 and even rarely used icons 28 may be demoted to the secondary screen 48. As only the highest-ranking icons 28 need be displayed, the algorithm 52 may enlarge the four (4) icons 28 to consume most of the home screen 26. This enlargement allows reliable selection, despite the state 46 of mobility. Indeed, even spacing between the icons 28 may be adjusted, based on the operational state 80. Should the mobile device 20 be nearly stationary, conversely smaller-sized icons 28 may be adequate, thus allowing more icons to be simultaneously displayed by the home screen 26.

FIG. 23 illustrates text sizing. Here, any text 232 displayed on the home screen 26 may be sized according to the operational state 80. Fonts may be enlarged, or decreased, in response to the operational state 80. For example, weather information may be enlarged in some operational states 80 and reduced in others. Similarly, a time display may be enlarged in some operational states 80 and reduced in others. SMS text messages may be enlarged for easier reading, even though a response text may be prohibited (perhaps when driving). Whatever the text 232, the text 232 may be sized according to the operational state 80.

FIG. 24 is another schematic illustrating the database 90 of iconic arrangements. The database 90 of iconic arrangements again associates the different operational states 80 to their corresponding iconic arrangements 92. Here, though, the iconic arrangements 92 may be augmented with sizing adaptations 234. The algorithm 52 may size 230 the icons 28 and the text 232 according to the operational state 80. The algorithm 52 queries the table 94 for the operational state 80 and retrieves the corresponding iconic arrangement 92 with the sizing adaptations 234. The algorithm 52 then dynamically arranges and sizes the icons 28 and the text 232, as this disclosure explains. Large sizing of the icons 28 and the text 232 enable reliable use where mobility and vibration impact readability and selectability. The risk of incorrect selections and distractions whilst driving is thus reduced. Small sizing, on the other hand, enables comprehensive and flexible use where mobility and vibration may not impact safety, readability and selectability. The algorithm 52 also removes the hassle associated with manually adapting the home screen 26.

Figure 25:
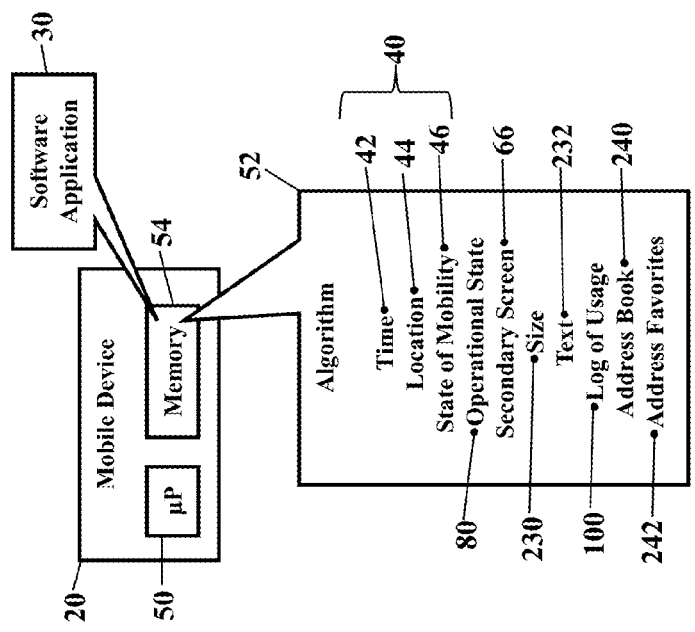
FIGS. 25-26 are schematics illustrating adaptation of an address book, according to exemplary embodiments.
Figure 26:
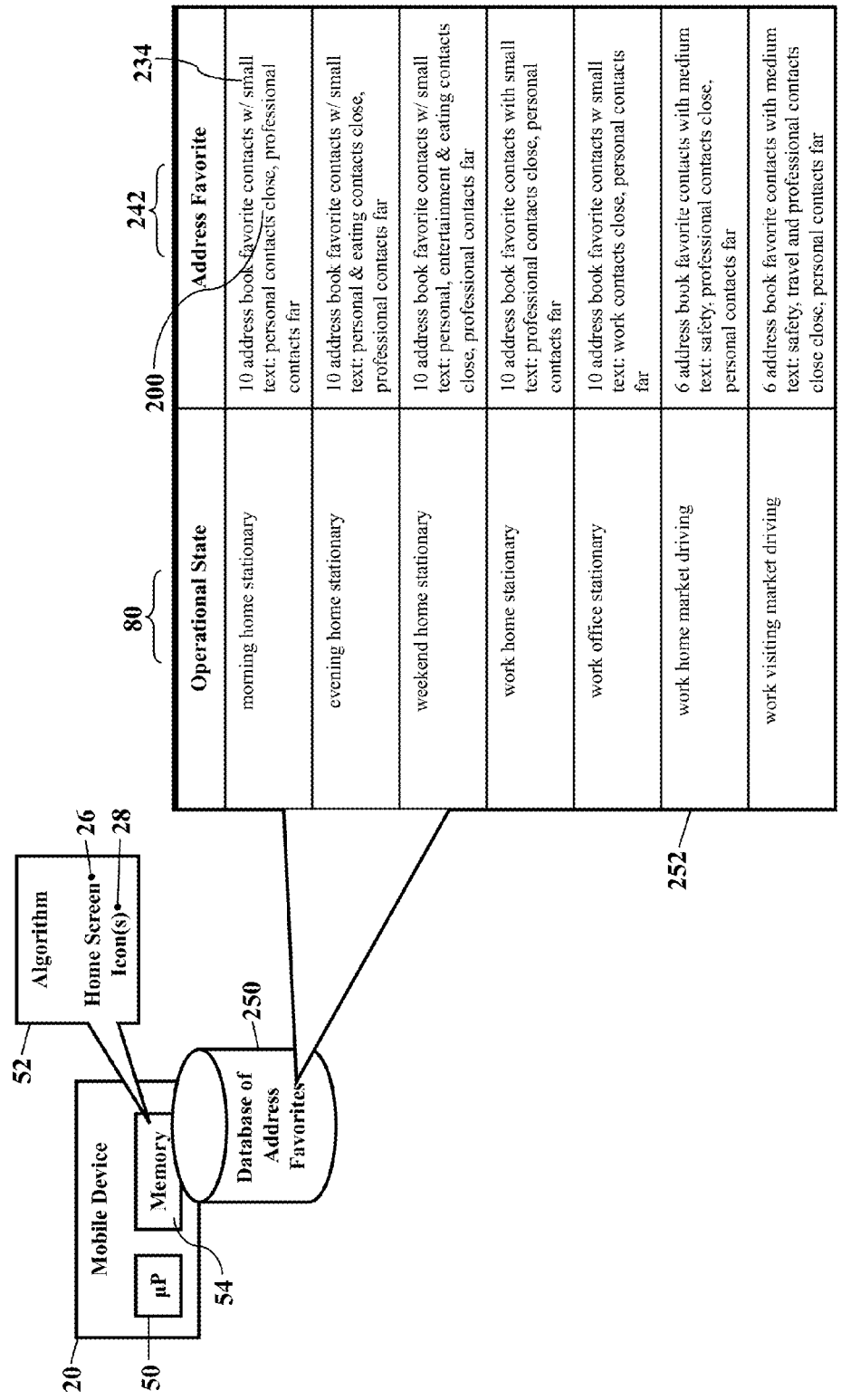

FIGS. 25-26 are schematics illustrating adaptation of an address book 240, according to exemplary embodiments. Here the user's address book 240 may adapt, according to the operational state 80. As the operational state 80 changes, the user's address book 240 may sort its contacts entries according to the time 42 of day, the location 44, and the state 46 of mobility. The size 230 of the text 232 may also adjust, according to the operational state 80. As the reader likely understands, one of the software applications 30 is the electronic address book 240 that stores voice, text, and other contacts. The mobile device 20 may store many, perhaps hundreds, of contact entries in the address book 240. The mobile device 20 may thus store many email addresses, phone numbers, street addresses, and even notes regarding the many contact entries. The mobile device 20 may thus sort and display the address book 240 with entries that are easy to see, reach, and select on a single screen. With this in mind, conventional mobile devices commonly spread the user's contact entries over multiple screens, through which the user must scroll.

Exemplary embodiments, then, may be applied to the user's address book 240. As the user carries the mobile device 20 throughout the day, the user's needs and habits may change, according to the operational state 80. For example, the user has very different visibility and calling habits when driving a vehicle on personal time, versus when the user is sitting in the office during the workday. As the mobile device 20 is used, exemplary embodiments may record calling behaviors, texting behaviors, and the other usage information in the log 100 of usage (as explained with reference to FIG. 5). Even though the address book 240 may store hundreds of contact entries, small sets of contacts are generally only useful for a narrow subset of conditions. For example, a work contact may be useful during workday hours, but the work contact may be unavailable outside those hours. Likewise, a subset of contacts is called and needed while driving, but perhaps not so important at other conditions 40. The algorithm 52 may thus intelligently adapt the user's address book 240 in order to improve the usability and safety.

The user's address book 240 may thus intelligently adapt. The algorithm 52 determines the operational state 80 (from the time 42 of day, the location 44, and the state 46 of mobility). Over time the algorithm 52 learns which contacts are used most often for each condition. For example, the algorithm 52 learns how often each contact is called, how often each contact is texted, and/or how long any communication with each contact is displayed for each condition. The algorithm 52 thus determines which contacts are used most often for each condition 40. The algorithm 52 may then generate address favorites 242 for the operational state 80. That is, the algorithm 52 sorts and condenses the hundreds of entries in the address book 240 to only those contacts that are historically relevant to the operational state 80. The algorithm 52 thus causes the mobile device 20 to visually display (and/or audibly present) the address favorites 242 for the operational state 80. For example, the most frequently used contacts may be positioned closest to the user's preferred thumb (as earlier paragraphs explained). Lesser-used contacts may be positioned further from the user's thumb or even demoted to the secondary screen 48. If the operational state 80 warrants, some contacts may be categorized, such as "unavailable after hours" and deliberately demoted to the secondary screen 48. Other contacts, for example, may be categorized "safe driving enablers" (E911 and roadside assistance) and prominently positioned for close, quick selection.

Sizing and fonting may also be adapted. As this disclosure explains, the size 230 of the text 232 for any contact may also adjust, according to the operational state 80. That is, once the algorithm 52 generates the address favorites 242 for the operational state 80, the font size 230 of the contacts listing may be enlarged, or reduced, to suit the state 46 of mobility and most likely contact use. For example, if the user is walking, the algorithm 52 may enlarge the four (4) highest ranking, most important contact text lines to fill the home screen 26. This textual enlargement enables reliable use where the relative position of the mobile device 20 and user are constantly changing by large amounts. If the mobile device 20 is stationary, the relative position of the mobile device 20 and user does not relatively change, so more contacts may be displayed with smaller text on the same home screen 26. If the user is driving, the algorithm 52 may enlarge the six (6) most important contact text lines to fill the home screen 26, thus enabling safer operation when required whilst driving.

FIG. 26 illustrates the address favorites 242. As there may be different address favorites 242 for different operational states 80, the mobile device 20 may store associations in the memory 54. That is, the address favorites 242 may be stored in a database 250 of address favorites. FIG. 26 illustrates the database 250 of address favorites as a table 252 that maps, relates, or associates the different operational states 80 to their corresponding address favorites 242. Once the algorithm 52 determines the operational state 80, the algorithm 52 queries the database 250 of address favorites for the operational state 80. If a match exists, the algorithm 52 retrieves the corresponding address favorites 242. As FIG. 26 also illustrates, each address favorite 242 may also include the sizing adaptations 234 for the text 232 and the positional ranking 200 for the location of the contacts. The algorithm 52 then positions the address favorites 242 to the user's desired location (such as the home button 120 or the user's preferred thumb, as explained above).

Figure 27:
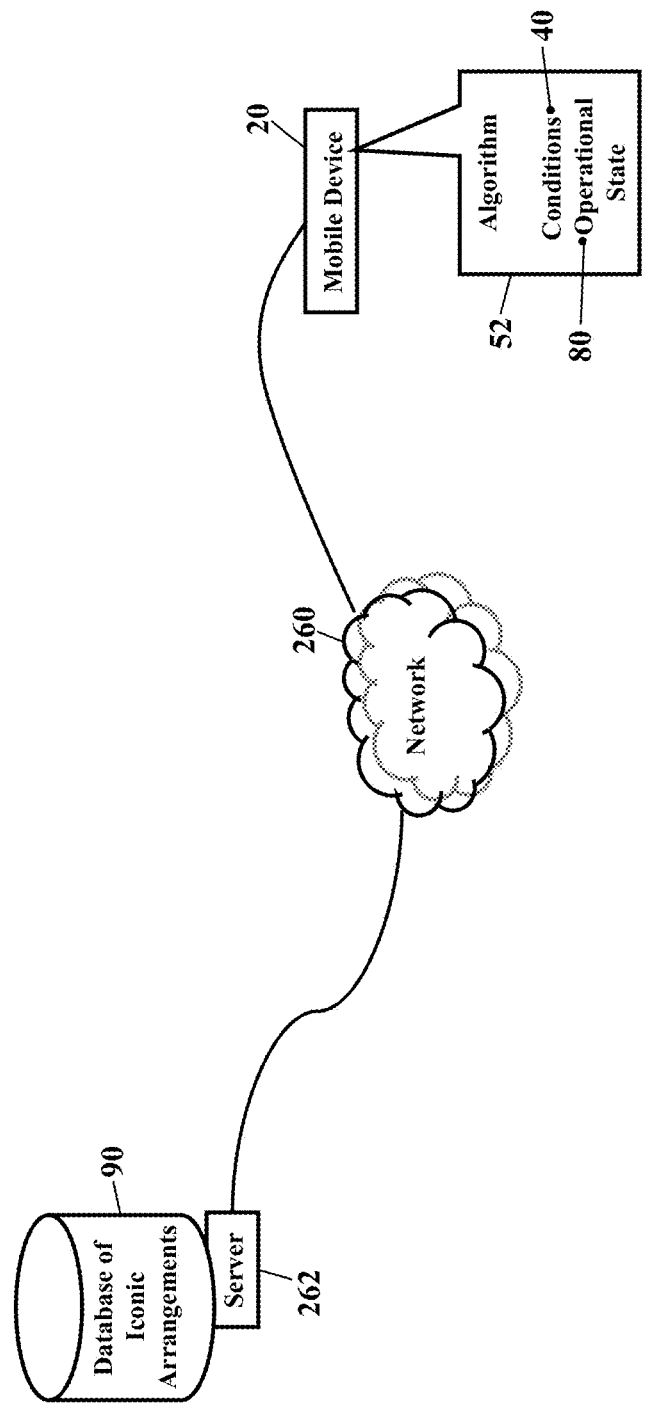
FIG. 27 is a schematic illustrating an alternate operating environment, according to exemplary embodiments.

FIG. 27 is a schematic illustrating an alternate operating environment, according to exemplary embodiments. Here the database 90 of iconic arrangements may be remotely stored and accessed from any location within a network 260. The database 90 of iconic arrangements, for example, may be stored in a server 262. Once the algorithm 52 determines the conditions 40, the algorithm 52 instructs the mobile device 20 to send a query to the server 262. That is, the mobile device 20 queries the server 262 for the conditions 40. If a match is found, the server 262 sends a response, and the response includes the operational state 80. Remote, central storage relieves the mobile device 20 from locally storing and maintaining the database 90 of iconic arrangements. Similarly, any portion of the exemplary embodiments may be remotely stored and maintained to relieve local processing by the mobile device 20.

Exemplary embodiments may be applied regardless of networking environment. Exemplary embodiments may be easily adapted to mobile devices having cellular, WI-FI®, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Figure 28:
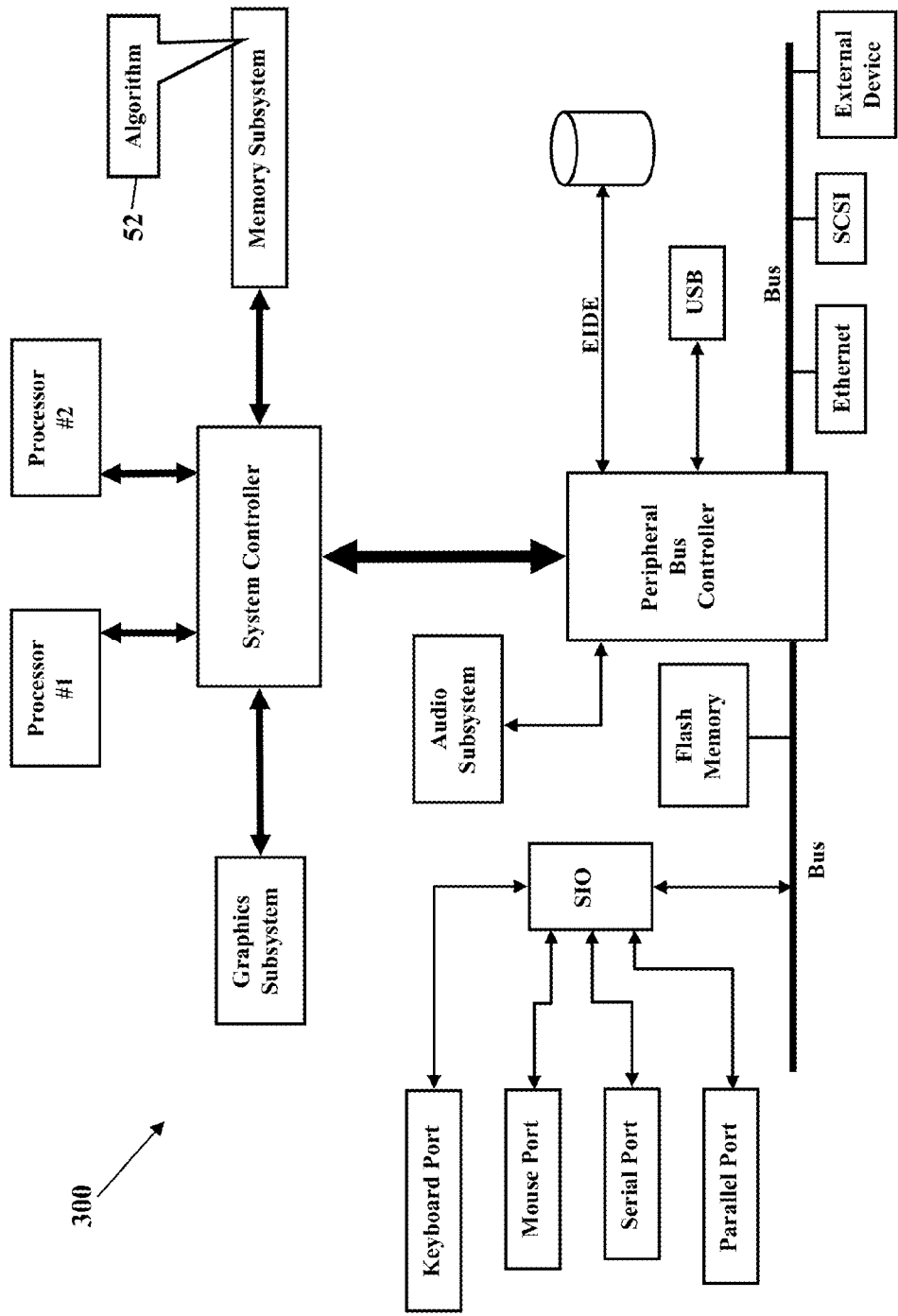
FIGS. 28-29 depict still more operating environments for additional aspects of the exemplary embodiments.

FIG. 28 is a schematic illustrating still more exemplary embodiments. FIG. 28 is a more detailed diagram illustrating a processor-controlled device 300. As earlier paragraphs explained, the algorithm 52 may operate in any processor-controlled device. FIG. 28, then, illustrates the algorithm 52 stored in a memory subsystem of the processor-controlled device 300. One or more processors communicate with the memory subsystem and execute either, some, or all applications. Because the processor-controlled device 300 is well known to those of ordinary skill in the art, no further explanation is needed.

Figure 29:
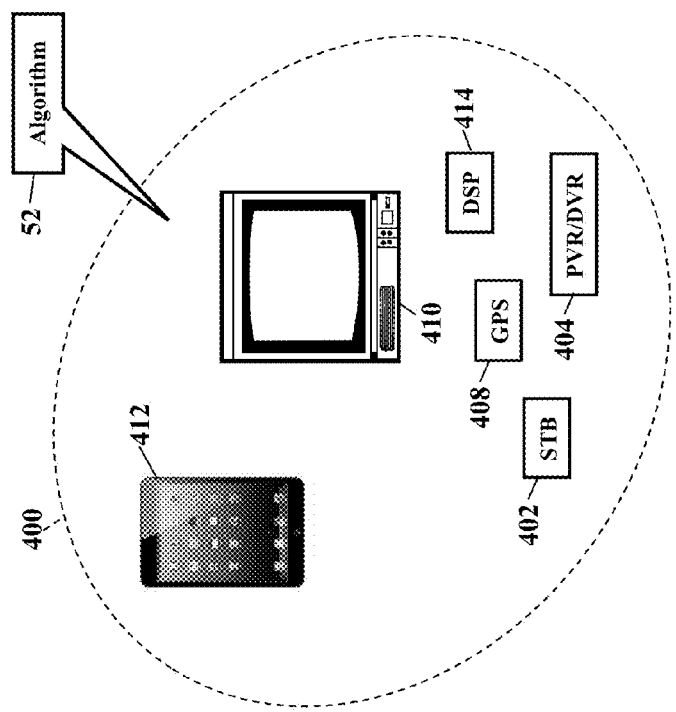

FIG. 29 depicts other possible operating environments for additional aspects of the exemplary embodiments. FIG. 29 illustrates the algorithm 52 operating within various other devices 400. FIG. 29, for example, illustrates that the algorithm 52 may entirely or partially operate within a set-top box ("STB") (402), a personal/digital video recorder (PVR/DVR) 404, a Global Positioning System (GPS) device 408, an interactive television 410, a tablet computer 412, or any computer system, communications device, or processor-controlled device utilizing the processor 50 and/or a digital signal processor (DP/DSP) 414. The device 400 may also include watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for intelligent adaptation of icons, text, fonts, and address books, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method, comprising:

generating, by a sensor in a mobile device, an output in response to a vibrational input, the output indicating a measure of the vibrational input;

determining, by a processor in the mobile device, an operational state of the mobile device based on the measure of the vibrational input;

retrieving, by the processor, an address book having electronic database associations between different contact addresses to different operational states of the mobile device;

determining, by the processor, a contact address of the contact addresses in the address book that has an electronic database association with the operational state determined from the measure of the vibrational input; and displaying the contact address on a display device of the mobile device;

wherein the vibrational input to the mobile device determines which contact in the address book is preferred.

2. The method of claim 1, further comprising associating the different contact addresses to different measures of the vibrational input.

3. The method of claim 2, further comprising:

retrieving a position that is associated with the measure of the vibrational input; and positioning the address at the position on the display device.

4. The method of claim 1, further comprising sorting the contact addresses in the address book according to working hours.

5. The method of claim 1, further comprising sorting the contact addresses in the address book according to personal hours.

6. The method of claim 1, further comprising sorting the contact addresses in the address book according to a state of mobility.

7. The method of claim 1, further comprising categorizing one of the contact addresses as unavailable during the operational state.

8. The method of claim 7, further comprising demoting the one of the contact addresses to a secondary screen of the mobile device.

9. The method of claim 1, further comprising ranking the contact addresses.

10. The method of claim 9, further comprising positioning the contact address at a position on the display device within a thumb radius of a home button of the mobile device.

11. A system, comprising:

a processor; and a memory storing instructions that when executed cause the processor to perform operations, the operations comprising:

receiving a sensor output generated in response to a measure of a vibrational input to a mobile device;

retrieving an address book having electronic database associations between different contact addresses to different measures of the vibrational input to the mobile device;

generating address favorites from the address book having the electronic database associations that match the measure of the vibrational input to the mobile device; and displaying the address favorites on a display device of the mobile device, wherein the vibrational input to the mobile device determines which contacts in the address book are preferred.

12. The system of claim 11, wherein the operations further comprise displaying the measure of the vibrational input on the display device.

13. The system of claim 12, wherein the operations further comprise:

retrieving a position that is associated with the measure of the vibrational input; and positioning the address favorites at the position on the display device.

14. The system of claim 11, wherein the operations further comprise ranking the contacts in the address book.

15. The system of claim 11, wherein the operations further comprise retrieving a size associated with the measure of the vibrational input.

16. The system of claim 15, wherein the operations further comprise sizing the address favorites displayed on the display device of the mobile device to the size associated with the measure of the vibrational input.

17. The system of claim 11, wherein the operations further comprise:

retrieving a thumb radius indicating a length of a thumb; and positioning the address favorites at a position on the display device within the thumb radius of a home button.

18. A memory storing instructions that when executed cause a processor to perform operations, the operations comprising:

receiving a sensor output generated in response to a measure of a vibrational input to a mobile device;

retrieving an address book having electronic database associations between different contact addresses to different measures of the vibrational input to the mobile device;

generating address favorites from the address book having the electronic database associations that match the measure of the vibrational input to the mobile device; and displaying the address favorites on a display device of the mobile device, wherein the vibrational input to the mobile device determines which contacts in the address book are preferred.

19. The memory of claim 18, wherein the operations further comprise displaying the measure of the vibrational input on the display device.

20. The memory of claim 19, wherein the operations further comprise:

retrieving a position having one of the electronic database associations with the measure of the vibrational input; and positioning the address favorites at the position on the display device.

* * * * *